United States Patent
Takenouchi

(10) Patent No.: US 9,201,915 B2
(45) Date of Patent: Dec. 1, 2015

(54) ATTRIBUTE INFORMATION PROCESSING DEVICE, ATTRIBUTE INFORMATION PROCESSING METHOD AND ATTRIBUTE INFORMATION EVALUATION SYSTEM

(75) Inventor: Takao Takenouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 244 days.

(21) Appl. No.: 13/822,984

(22) PCT Filed: Jun. 28, 2011

(86) PCT No.: PCT/JP2011/003676
§ 371 (c)(1),
(2), (4) Date: Mar. 13, 2013

(87) PCT Pub. No.: WO2012/039085
PCT Pub. Date: Mar. 29, 2012

(65) Prior Publication Data
US 2013/0173620 A1 Jul. 4, 2013

(30) Foreign Application Priority Data
Sep. 22, 2010 (JP) ................................. 2010-211521

(51) Int. Cl.
*G06F 17/30* (2006.01)
*H04L 29/06* (2006.01)
*G06F 21/55* (2013.01)

(52) U.S. Cl.
CPC ........ *G06F 17/30312* (2013.01); *G06F 21/554* (2013.01); *H04L 63/04* (2013.01); *G06F 2221/2117* (2013.01)

(58) Field of Classification Search
CPC ........................... G06F 17/30312; G06F 17/30
USPC ........................ 707/736, E17.055, E17.044
See application file for complete search history.

(56) References Cited

U.S. PATENT DOCUMENTS

2007/0168331 A1* 7/2007 Reddy et al. ...................... 707/3
2008/0133587 A1* 6/2008 Ganugapati et al. ...... 707/103 R (Continued)

FOREIGN PATENT DOCUMENTS

| JP | 04-024785 A | 1/1992 |
|----|-------------|--------|
| JP | 2000-324094 A | 11/2000 |
| JP | 2005-084828 A | 3/2005 |
| JP | 2007-053655 A | 3/2007 |
| JP | 2007-295511 A | 11/2007 |
| JP | 2007-304985 A | 11/2007 |

(Continued)

OTHER PUBLICATIONS

International Search Report (PCT/ISA/210) dated Aug. 2, 2011 issued by the International Searching Authority in counterpart International Application No. PCT/JP2011/003676.

*Primary Examiner* — Mariela Reyes
*Assistant Examiner* — Soheila Davanlou
(74) *Attorney, Agent, or Firm* — Sughrue Mion, PLLC

(57) ABSTRACT

An attribute information processing device includes: an attribute information acquiring unit that acquires attribute information; an attribute value acquiring unit that acquires at least two types of attribute values including a first-type attribute value and a second-type attribute value corresponding to an attribute value of the acquired attribute information; a generating unit that determines a function for obtaining an evaluation value from the acquired two or more types of attribute values, determines a acquisition source of the first-type attribute value to be a first-attribute providing device that can provide the first-type attribute value concerning attribute information serving as a comparison target, determines an acquisition source of the second-type attribute value to be a second-attribute providing device different from the first-attribute providing device, and generates attribute evaluation information containing information on the function, an evaluation value, information for identifying the first-attribute providing device, and information for identifying the second-attribute providing device; and an output unit that outputs the second-type attribute value and the attribute evaluation information.

8 Claims, 25 Drawing Sheets

(56) References Cited

U.S. PATENT DOCUMENTS

2010/0161603 A1* 6/2010 Caceres .................. 707/736
2011/0029546 A1* 2/2011 Mineno et al. ............ 707/756
2011/0314010 A1* 12/2011 Ganti et al. .............. 707/728

FOREIGN PATENT DOCUMENTS

| | | |
|---|---|---|
| JP | 2009-064476 A | 3/2009 |
| JP | 2009-122738 A | 6/2009 |
| JP | 2009-200696 A | 9/2009 |

* cited by examiner

FIG. 7

| CONVERSION ID | PSEUDO ATTRIBUTE VALUE |
|---|---|
| H 0 0 1 | 3 |
| H 0 0 2 | 1 0 |
| H 0 0 3 | 8 |
| . | . |
| . | . |
| . | . |

FIG. 8

| TERMINAL ID | ATTRIBUTE TYPE | ATTRIBUTE VALUE |
|---|---|---|
| USER_A | PREFERENCE | GAME |
| USER_A | LOCATION | TAMACHI |
| USER_B | PREFERENCE | SPORTS |
| USER_B | LOCATION | SHIBUYA |
| USER_C | PREFERENCE | GAME |
| . | . | . |
| . | . | . |
| . | . | . |

FIG. 9

| ATTRIBUTE TYPE | CONVERSION ID | ATTRIBUTE-VALUE LIST |
|---|---|---|
| PREFERENCE | H001 | "GAME" - "1" <br> "SPORTS" - "2" |
| LOCATION | H002 | "TAMACHI" - "100" <br> "HAMAMATSUCHO" - "200" |
| . <br> . <br> . | . <br> . <br> . | . <br> . <br> . |

FIG. 11

| TERMINAL ID | CONVERSION ID | ATTRIBUTE EVALUATION INFORMATION |
|---|---|---|
| USER_A | H001 | (FIRST-ATTRIBUTE PROVIDING DEVICE.PREFERENCE + SECOND-ATTRIBUTE PROVIDING DEVICE.PREFERENCE) = 4 |
| USER_A | H002 | (FIRST-ATTRIBUTE PROVIDING DEVICE.LOCATION + SECOND-ATTRIBUTE PROVIDING DEVICE.LOCATION) = 110 |
| . | . | . |
| . | . | . |
| . | . | . |

FIG. 18

| CONVERSION ID | TYPE CONVERSION INFORMATION |
|---|---|
| H001 | "RECENTLY PURCHASED GOODS" - "TYPE1" |
| H002 | "PREFERENCE" - "TYPE35" |
| . . . | . . . |

FIG. 22

| ATTRIBUTE TYPE | CHANGE TIMING |
|---|---|
| LOCATION | 5 TIMES/HOUR |
| AGE | 1 TIME/YEAR |
| . | . |
| . | . |
| . | . |

FIG. 24

| ATTRIBUTE TYPE | ATTRIBUTE PROVIDING DEVICE |
|---|---|
| LOCATION | ATTRIBUTE PROVIDING DEVICE A |
| LOCATION | ATTRIBUTE PROVIDING DEVICE B |
| LOCATION | ATTRIBUTE PROVIDING DEVICE C |
| RECENTLY PURCHASED GOODS | ATTRIBUTE PROVIDING DEVICE A |
| RECENTLY PURCHASED GOODS | ATTRIBUTE PROVIDING DEVICE B |
| . | . |
| . | . |
| . | . |

FIG. 25

| ATTRIBUTE TYPE | ATTRIBUTE PROVIDING DEVICE | PERCENTAGE OF STATE ||
| --- | --- | --- | --- |
| | | ATTRIBUTE VALUE | PERCENTAGE |
| GENDER | ATTRIBUTE PROVIDING DEVICE A | MALE | 20% |
| GENDER | ATTRIBUTE PROVIDING DEVICE A | FEMALE | 80% |
| GENDER | ATTRIBUTE PROVIDING DEVICE B | MALE | 80% |
| GENDER | ATTRIBUTE PROVIDING DEVICE B | FEMALE | 20% |
| GENDER | ATTRIBUTE PROVIDING DEVICE C | MALE | 20% |
| GENDER | ATTRIBUTE PROVIDING DEVICE C | FEMALE | 80% |
| RECENTLY PURCHASED GOODS | ATTRIBUTE PROVIDING DEVICE B | GAME | 90% |
| RECENTLY PURCHASED GOODS | ATTRIBUTE PROVIDING DEVICE B | COSMETICS | 10% |
| ⋮ | ⋮ | | |

# ATTRIBUTE INFORMATION PROCESSING DEVICE, ATTRIBUTE INFORMATION PROCESSING METHOD AND ATTRIBUTE INFORMATION EVALUATION SYSTEM

CROSS REFERENCE TO RELATED APPLICATIONS

This application is a National Stage of International Application No. PCT/JP2011/003676 filed Jun. 28, 2011, claiming priority based on Japan Patent Application No. 2010-211521 filed Sep. 22, 2010, the contents of all of which are incorporated herein by reference in their entirety.

TECHNICAL FIELD

The present invention relates to a technique for processing attribute information including an attribute type and an attribute value indicating a state or value of the attribute type.

BACKGROUND ART

In recent years, various kinds of information are digitized, and are provided through the Internet or other environments. Under these circumstances, there are systems that utilize these environments to acquire attribute information on users, and provide services suitable for the individual users.

However, there are increasing problems of leakage of information such as personal information handled in these systems, or confidential information that companies have. For example, Patent Document 1 listed below discloses a system that includes plural data providers, data users, and a trusted third party (TTP). In this system, plural personal data provided by the plural data providers are distributed to data users in a manner such that each of the provided personal data does not include any personal indentifying information, and hence, can be recognized as data associated with each individual. With this system, it is possible to hide the identity of the personal data.

RELATED DOCUMENT

Patent Document

Patent Document 1: Japanese Patent Application Laid-open No. 2000-324094
Patent Document 2: Japanese Patent Application Laid-open No. 2005-084828
Patent Document 3: Japanese Patent Application Laid-open No. 2007-053655
Patent Document 4: Japanese Patent Application Laid-open No. 2007-304985
Patent Document 5: Japanese Patent Application Laid-open No. 2009-064476
Patent Document 6: Japanese Patent Application Laid-open No. 2009-122738
Patent Document 7: Japanese Patent Application Laid-open No. H04-024785

SUMMARY OF THE INVENTION

However, with the system described above, it is necessary to provide the third part (TTP) with location information which indicates the place where each of the personal data exists, for example, which data provider owns user's personal data. Thus, if a malicious operator obtains this location information on the personal data from the TTP, which is the third party, the malicious operator can easily narrow down the attacking target, which results in an increase in the risk of the information leakage.

Further, with the above-described system, the personal data concerning each of the users itself are obtained from the TTP, which is the third part. Thus, these personal data may leak from the TPP. This means that the leakage source is not limited to the data providers, which also increases the risk of the information leakage.

An object of an aspect of the present invention is to provide a technique for reducing the risk of leakage of attribute information.

Each aspect of the present invention employs the following configurations to solve the problem described above.

A first aspect relates to an attribute information processing device. The attribute information processing device according to the first aspect includes an attribute information acquiring unit that acquires attribute information including an attribute type and an attribute value indicating a state or value of the attribute type, an attribute value acquiring unit that acquires at least two types of attribute values including a first-type attribute value and a second-type attribute value each corresponding to an attribute value of the attribute information acquired by the attribute information acquiring unit, a generating unit that determines a function for obtaining an evaluation value on from at least two types of attribute values acquired by the attribute value acquiring unit, determines an acquisition source of the first-type attribute value to be a first-attribute providing device that can provide the first-type attribute value concerning attribute information serving as a comparison target, determines an acquisition source of the second-type attribute value to be a second-attribute providing device different from the first-attribute providing device, and generates attribute evaluation information containing information on the function, an evaluation value, information for identifying the first-attribute providing device, and information for identifying the second-attribute providing device, and an output unit that outputs the second-type attribute value to be stored in the second-attribute providing device serving as the acquisition source of the second-type attribute value, and outputs the attribute evaluation information to be used for evaluating the attribute information acquired by the attribute information acquiring unit and the attribute information serving as the comparison target.

A second aspect relates to an attribute information evaluation system including the attribute information processing device according to the first aspect, a first-attribute providing device, a second-attribute providing device, and an evaluation device. In the attribute information evaluation system according to the second aspect, the first-attribute providing device includes a transmitting unit that, in response to a request from the evaluation device, transmits a first-type attribute value corresponding to an attribute value of the attribute information serving as the comparison target to the evaluation device; the second-attribute providing device includes a storage unit that stores, in a second-type attribute value storage unit, the second-type attribute value outputted by the output unit of the attribute information processing device, and a transmitting unit that, in response to a request from the evaluation device, transmits the second-type attribute value stored in the second-type attribute value storage unit to the evaluation device; the evaluation device includes an evaluation unit that acquires the first-type attribute value and the second-type attribute value from the first-attribute providing device and the second-attribute providing device on the basis of information on acquisition sources of the first-type attribute value and the second-type attribute value contained in the attribute evaluation information outputted by the output unit of the attribute information processing device, calculates a new evaluation value by applying the acquired attribute values to the function contained in the attribute evaluation information, and evaluates the attribute information acquired by the attribute information acquiring unit of the attribute information processing device and the attribute information serving as the comparison target by comparing the new evaluation value with the evaluation value contained in the attribute evaluation information.

It should be noted that another aspect of the present invention may include a method that causes a computer to perform processes performed in the configurations described above, a program that causes a computer to realize the configuration, and a computer-readable storage medium that stores the program. This storage medium includes a non-transitory tangible media.

According to the aspects described above, it is possible to achieve the technique that reduces the risk of leakage of the attribute information.

BRIEF DESCRIPTION OF THE DRAWINGS

FIG. 7 is a diagram illustrating an example of a pseudo attribute value storage unit.

FIG. 8 is a diagram illustrating an example of an attribute value storage unit.

FIG. 9 is a diagram illustrating an example of an attribute-value list storage unit.

FIG. 11 is a diagram illustrating an example of an attribute evaluation information storage unit.

FIG. 18 is a diagram illustrating an example of a type-conversion-information storage unit.

FIG. 22 is a diagram illustrating an example of a change timing storage unit.

FIG. 24 is a diagram illustrating an example of a device information storage unit.

FIG. 25 is a diagram illustrating a modification example of the device information storage unit.

DESCRIPTION OF EXEMPLARY EMBODIMENTS

Figure 1:
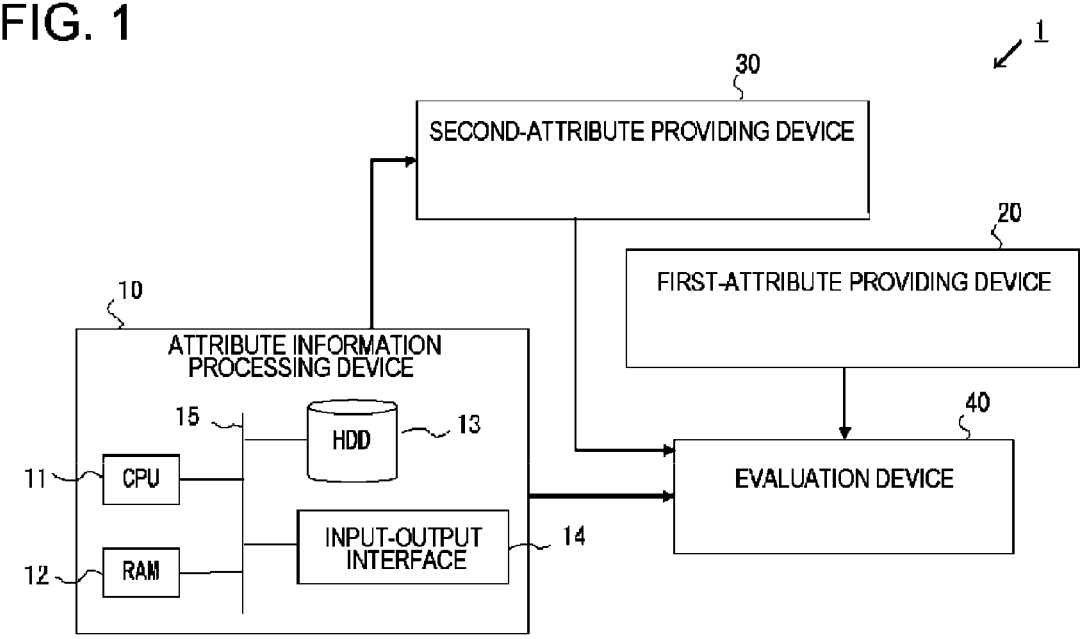
FIG. 1 is a diagram illustrating an example of a configuration of an attribute information evaluation system according to a first exemplary embodiment.

Hereinbelow, exemplary embodiments of the present invention will be described with reference to the drawings. Note that, in all the drawings, the same constituent components are denoted by the same reference characters, and detailed explanation thereof will not be repeated. Further, exemplary embodiments described below are merely examples, and the present invention is not limited to the configurations of the exemplary embodiments described below.

[First Exemplary Embodiment]

FIG. 1 is a diagram illustrating an example of a configuration of an attribute information evaluation system 1 according to a first exemplary embodiment. The attribute information evaluation system 1 includes an attribute information processing device (hereinafter, also referred to as a processing device) 10, a first-attribute providing device 20, a second-attribute providing device 30, and an evaluation device 40. The attribute information evaluation system 1 makes an evaluation of whether attribute information acquired by the processing device 10 matches other attribute information serving as a comparison target.

[Hardware Configuration]

As illustrated in FIG. 1, as a hardware configuration, the processing device according to the first exemplary embodiment includes a central processing unit (CPU) 11, a memory such as a random access memory (RAM) 12, a hard disk 13 and a read only memory (ROM), which is not illustrated, and various input-output interfaces 14. The units described above are connected to each other through a bus 15. Depending on necessary functions, the input-output interface 14 includes, for example, a user interface (UI) controller and a network interface (NI) controller. The input-output interface 14 functions as an interface that enables the processing device 10 according to the first exemplary embodiment to communicate with the first-attribute providing device 20, the second-attribute providing device 30, and the evaluation device 40.

The processing device 10 according to the first exemplary embodiment has a configuration in which a CPU 11 reads out and runs a program stored in a memory such as the hard disk 13 and the ROM to realize each processing unit (module) described below. The program described above may be installed from a storage medium such as a compact disk (CD), or may be installed from other device through a network. The first-attribute providing device 20, the second-attribute providing device 30, and the evaluation device 40 also have a hardware configuration similar to that of the processing device 10. However, this exemplary embodiment does not limit the hardware configurations of the processing device 10, the first-attribute providing device 20, the second-attribute providing device 30, and the evaluation device 40.

[Process Configuration]

Figure 2:
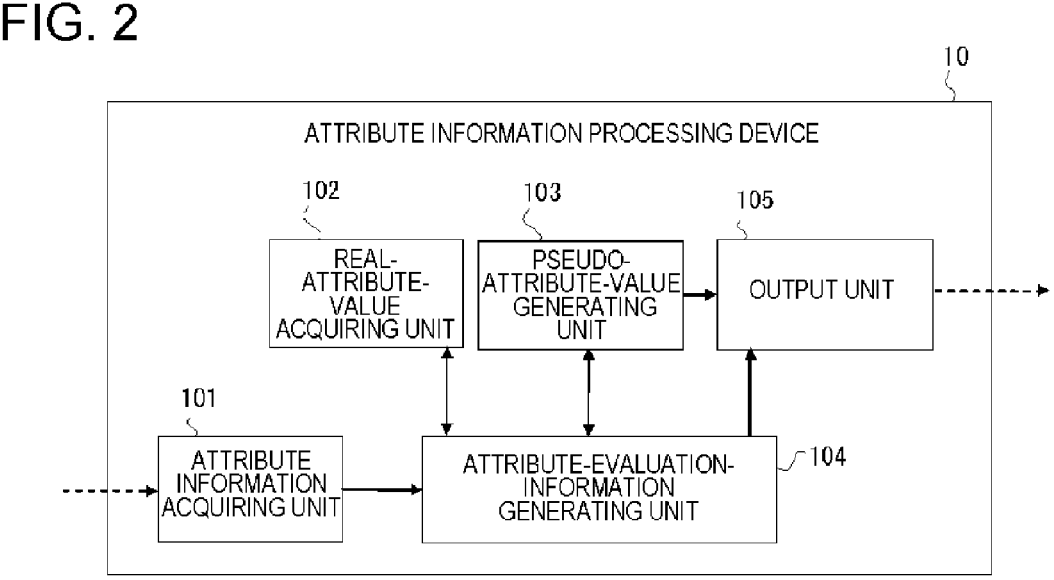
FIG. 2 is a schematic view illustrating an example of a process configuration of an attribute information processing device according to the first exemplary embodiment.

FIG. 2 is a schematic view illustrating an example of a process configuration of the processing device 10 according to the first exemplary embodiment. As illustrated in FIG. 2, the processing device 10 according to the first exemplary embodiment includes an attribute information acquiring unit 101, a real-attribute-value acquiring unit 102, a pseudo-attribute-value generating unit 103, an attribute-evaluation-information generating unit 104, and an output unit 105. The real-attribute-value acquiring unit 102 and the pseudo-attribute-value generating unit 103 may be collectively referred to as an attribute value acquiring unit. Hereinbelow, the attribute-evaluation-information generating unit 104 may be also referred to as a generating unit 104.

The attribute information acquiring unit 101 acquires attribute information including an attribute type, and an attribute value indicating a state or value of the attribute type. The attribute type represents a type of the attribute information. The attribute information represents information on an attribute concerning a user such as age, gender, a current location, and a medical history. For example, in the case where the attribute information is "gender=male," the attribute type is "gender" and the attribute value is "male." Further, in the case where the attribute information is "age=40," the attribute type is "age" and the attribute value is "40." Note that this exemplary embodiment does not limit the attribute type and the attribute value to those described above.

The attribute information acquiring unit 101 may acquire the attribute information from other device through communication, or may acquire the attribute information inputted through a user interface, or may acquire the attribute information stored in advance in a memory. Further, this exemplary embodiment does not limit the data format of the attribute information, the attribute type and the attribute value, and these data formats may be formed by a character-string data, or by other computer-recognizable format.

The attribute value acquiring unit acquires at least two types of attribute values including a first-type attribute value and a second-type attribute value, each of which corresponds to the attribute value of the attribute information acquired by the attribute information acquiring unit 101. In the first exemplary embodiment, an example is given in which two types of the attribute values are used, and the first-type attribute value is referred to as a real attribute value and the second-type attribute value is referred to as a pseudo attribute value. More specifically, the real-attribute-value acquiring unit 102 acquires the real attribute value corresponding to the attribute value of the attribute information, and the pseudo-attribute-value generating unit 103 acquires the pseudo attribute value corresponding to the attribute value. Note that, in this exemplary embodiment, the type of the attribute value used is not limited to two types, and hence, it may be possible to employ a configuration in which two or more types of attribute values are used.

For example, the real-attribute-value acquiring unit 102 has a table in which the attribute value and the real attribute value are stored in a manner that they correspond to each other, and extracts, from this table, a real attribute value corresponding to one certain attribute value. The correspondence relationship between the attribute values and the real attribute values is shared between the processing device 10 and the first-attribute providing device 20. The correspondence relationship between the attribute value and the real attribute value represents, for example, information such as ("game"—"1") or ("sports"—"2") for an attribute type "preference."

The pseudo-attribute-value generating unit 103 may generate the pseudo attribute value in a random manner, or may extract the pseudo attribute value, for example, from a table. The first exemplary embodiment does not limit a method of acquiring the pseudo attribute value by the pseudo-attribute-value generating unit 103. As described later, the pseudo attribute value acquired by the pseudo-attribute-value generating unit 103 is stored in either the first-attribute providing device 20 or the second-attribute providing device 30.

The generating unit 104 generates attribute evaluation information concerning the attribute information acquired by the attribute information acquiring unit 101. More specifically, the generating unit 104 determines a function for obtaining an evaluation value on the basis of at least two types of attribute values acquired by the attribute value acquiring unit, determines an acquisition source of a first-type attribute value to be the first-attribute providing device 20 that can provide the first-type attribute value of attribute information serving as a comparison target, and determines an acquisition source of a second-type attribute value to be the second-attribute providing device 30, which is different from the first-attribute providing device 20. Further, the generating unit 104 generates attribute evaluation information including information on the function, an evaluation value, and information for identifying the first-attribute providing device 20 and the second-attribute providing device 30 serving as the acquisition sources of the first-type attribute value and the second-type attribute value, respectively.

This exemplary embodiment does not limit the data formats of the generated attribute evaluation information. These data formats may be formed by character-string data, or may be other computer-recognizable format. Further, for example, a function that adds a first variable and a second variable is used as the function determined by the generating unit 104. This exemplary embodiment does not limit to this function, and it may be possible to employ addition, subtraction, multiplication, division, or a combination thereof as the function. Further, it may be possible to employ a one-way function such as a hash function. Hereinbelow, regarding the functions determined by the generating unit 104, a variable to which the first-type attribute value (real attribute value) is applied is referred to as the first variable, and a variable to which the second-type attribute value (pseudo attribute value) is applied is referred to as the second variable.

The output unit 105 outputs the second-type attribute value so as to be stored in the second-attribute providing device 30 serving as the acquisition source of the second-type attribute value (pseudo attribute value), and outputs the attribute evaluation information so as to make the attribute evaluation information used for evaluating the attribute information acquired by the attribute information acquiring unit 101 and the attribute information serving as the comparison target. With this configuration, in the example of the first exemplary embodiment, the pseudo attribute value outputted by the output unit 105 is stored in the second-attribute providing device 30, and is used for evaluating the attribute evaluation information.

The first-attribute providing device 20 has at least one piece of attribute information (including the attribute information serving as the comparison target) on each user, and also has the correspondence relationship between the attribute value and the real attribute value concerning each attribute information. As described above, the correspondence relationship between the attribute value and the real attribute value is shared between the processing device 10 and the first-attribute providing device 20. Thus, it may be possible to employ a configuration in which the first-attribute providing device 20 has, in advance, the information same as the correspondence relationship that the processing device 10 has, or a configuration in which the first-attribute providing device 20 acquires this correspondence relationship from the processing device 10. In response to a request from the evaluation device 40, the first-attribute providing device 20 determines the attribute information on a user, which is a target of the request (attribute information serving as the comparison target), and sends back to the evaluation device 40 a real attribute value corresponding to the attribute value of the attribute type, which is a target of the request.

The second-attribute providing device 30 stores the pseudo attribute value outputted by the output unit 105. In response to a request from the evaluation device 40, the second-attribute providing device 30 sends back to the evaluation device 40 the stored pseudo attribute value. Note that it may be possible to employ a configuration in which, in the case where plural pseudo attribute values are stored, the second-attribute providing device 30 stores identification information for identifying each of the pseudo attribute values, and sends back the pseudo attribute value identified on the basis of the identification information contained in the request from the evaluation device 40.

The evaluation device 40 acquires the attribute evaluation information outputted by the output unit 105, and evaluates the acquired attribute evaluation information. In this evaluation, the evaluation device 40 acquires the real attribute value and the pseudo attribute value from the first-attribute providing device 20 and the second-attribute providing device 30 indicated by the acquisition-source information contained in this attribute evaluation information, and uses the real attribute value and the pseudo attribute value. This evaluation of the attribute evaluation information is made by determining whether the attribute information (attribute information acquired by the attribute information acquiring unit 101), from which the attribute evaluation information is obtained, matches other attribute information serving as the comparison target (attribute information serving as the comparison target). In this evaluation, the first-attribute providing device 20 sends, to the evaluation device 40, a real attribute value corresponding to the attribute value of the attribute information serving as the comparison target. A specific example of evaluation made by the evaluation device 40 will be described in Operation Example.

[Operation Example]

Figure 3:
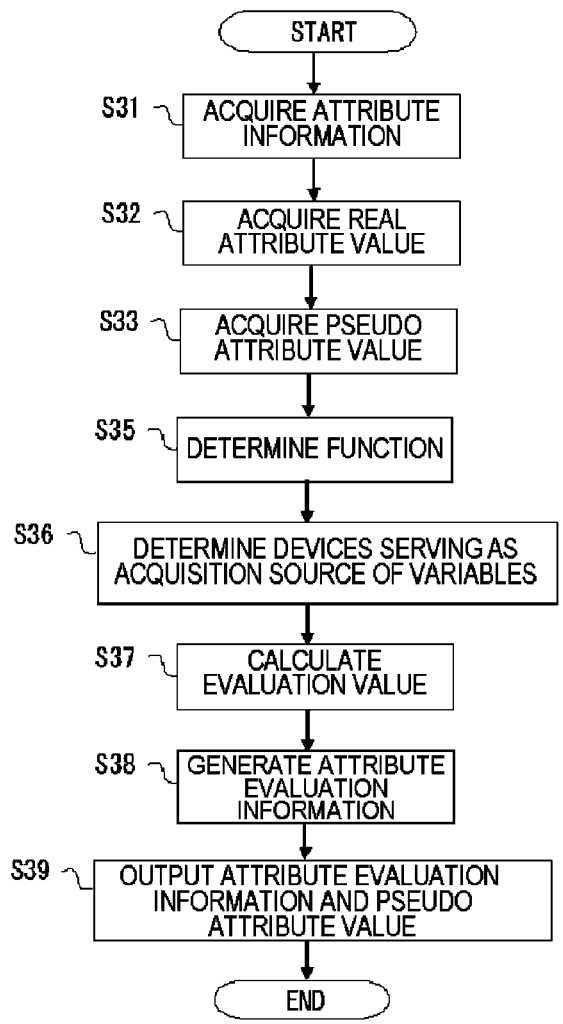
FIG. 3 is a flowchart showing an example of operations performed by the attribute information processing device according to the first exemplary embodiment.

FIG. 3 is a flowchart showing an example of operations performed by the processing device 10 according to the first exemplary embodiment.

In the processing device 10 according to the first exemplary embodiment, the attribute information acquiring unit 101 acquires attribute information (S31). In this exemplary embodiment, it is assumed as an example that "gender=male" is acquired as the attribute information. The attribute information acquiring unit 101 sends this attribute information to the generating unit 104.

Upon receiving the attribute information from the generating unit 104, the real-attribute-value acquiring unit 102 extracts an attribute value from the received attribute information. The real-attribute-value acquiring unit 102 acquires a real attribute value corresponding to the extracted attribute value (S32). For example, the real-attribute-value acquiring unit 102 acquires a real attribute value "1" corresponding to the attribute value "male" contained in the attribute information "gender=male." The acquired real attribute value is sent to the generating unit 104.

The pseudo-attribute-value generating unit 103 acquires a pseudo attribute value in response to a request from the generating unit 104 (S33). At this time, the pseudo-attribute-value generating unit 103 may receive the attribute information from the generating unit 104, and generate the pseudo attribute value on the basis of the received attribute information. For example, the pseudo-attribute-value generating unit 103 acquires a pseudo attribute value "3" corresponding to the attribute value "male" contained in the attribute information "gender=male." The pseudo-attribute-value generating unit 103 sends the acquired pseudo attribute value "3" to the generating unit 104 and the output unit 105.

Upon receiving the real attribute value and the pseudo attribute value, the generating unit 104 determines a function for the attribute information (S35). For example, the generating unit 104 determines that a function for the attribute information is addition of a first variable and a second variable ("first variable+second variable").

The generating unit 104 determines an acquisition source of the first variable to be the first-attribute providing device 20 that can provide a real attribute value of the attribute information on each user, and determines an acquisition source of the second variable to be the second-attribute providing device 30, which is different from the determined first-attribute providing device 20 (S36). The generating unit 104 sends, to the output unit 105, information on the thus determined first-attribute providing device 20 and information on the thus determined second-attribute providing device 30.

Further, the generating unit 104 applies the real attribute value acquired in S32 to the first variable, and applies the pseudo attribute value acquired in S33 to the second variable to calculate the function, thereby obtaining an evaluation value (S37). For example, the generating unit 104 obtains the evaluation value of "4" (=1+3).

Then, the generating unit 104 generates attribute evaluation information including the function determined in S35, the information on the first-attribute providing device 20 and the second-attribute providing device 30 determined in S36, the attribute type of the attribute information acquired in S31, and the evaluation value calculated in S37 (S38). For example, the generating unit 104 generates attribute evaluation information of "first-attribute providing device 20.gender+second-attribute providing device 30.gender=4." In this example, the information "(first-attribute providing device 20).(gender)" means, for example, that a portion after the period indicates the attribute type and a portion in front of the period indicates address information on the device from which the variable is acquired. The generating unit 104 sends the thus generated attribute evaluation information to the output unit 105.

The output unit 105 outputs the pseudo attribute value and the attribute evaluation information sent from the pseudo-attribute-value generating unit 103 (S39). With this configuration, for example, the outputted pseudo attribute value "3"

is stored in the second-attribute providing device 30, which is different from the first-attribute providing device 20 that can provide the real attribute value of the attribute information on each user. Further, the outputted attribute evaluation information is used to make an evaluation of whether the attribute information acquired by the attribute information acquiring unit 101 matches other attribute information serving as the comparison target. In the case where an evaluation is made of whether or not the other attribute information serving as the comparison target, for example, the attribute information "gender=female" of a user of the comparison target matches the attribute information "gender=male" acquired by the attribute information acquiring unit 101, the evaluation device 40 makes this evaluation, for example, in the following manner.

The evaluation device 40 receives from the processing device 10 according to the first exemplary embodiment the attribute evaluation information "first-attribute providing device 20.gender+second-attribute providing device 30.gender=4" for the attribute information "gender=male." On the basis of the acquisition-source information on the first variable and the second variable contained in the attribute evaluation information, the evaluation device 40 requests the first-attribute providing device 20 and the second-attribute providing device 30 to send attribute values concerning the gender of the user of the comparison target. At this time, the second-attribute providing device 30 stores the pseudo attribute value "3" outputted from the output unit 105, as described above. Then, the second-attribute providing device 30 sends the pseudo attribute value "3" to the evaluation device 40. On the other hand, the first-attribute providing device 20 determines the attribute information "gender=female" of the comparison-target user from among the attribute information on the users, extracts a attribute value "female" from the attribute information, and obtains a real attribute value corresponding to this attribute value. For example, a real attribute value "2" corresponding to the attribute value "female" can be obtained. The first-attribute providing device 20 sends the thus obtained real attribute value "2" to the evaluation device 40.

The evaluation device 40 applies the real attribute value obtained from the first-attribute providing device 20 and the pseudo attribute value obtained from the second-attribute providing device 30 to the first variable and the second variable of the function for the attribute evaluation information to calculate this function. In this example, the evaluation device 40 obtains an evaluation value "5" ("2"+"3"="5") as the results of this calculation. The evaluation device 40 compares the evaluation value "5" with the evaluation value "4" of the attribute evaluation information. Since both values are different, the evaluation device 40 determines that the attribute information "gender=female" of the user serving as the comparison target does not match the attribute information "gender=male" acquired by the attribute information acquiring unit 101.

On the other hand, In the case where the attribute information on the user serving as the comparison target and stored in the first-attribute providing device 20 is "gender=male," a real attribute value "1" is sent from the first-attribute providing device 20 to the evaluation device 40. In this case, the evaluation device 40 can obtain an evaluation value "4," which is equal to the evaluation value "4" of the attribute evaluation information, and thus determines that the attribute information on the user serving as the comparison target matches the attribute information acquired by the attribute information acquiring unit 101.

As described above, according to the first exemplary embodiment, when evaluating the attribute information, the evaluation device 40 uses the attribute evaluation information generated by the processing device 10 according to the first exemplary embodiment. The attribute evaluation information does not contain the information on the attribute value (attribute value). Thus, even if attribute evaluation information leaks from the evaluation device 40 and a third party obtains the attribute evaluation information, the third party cannot acquire attribute information, which is the source of the attribute evaluation information.

Further, according to the first exemplary embodiment, when the attribute evaluation information is used, the real attribute value and the pseudo attribute value obtained from the first-attribute providing device 20 and the second-attribute providing device 30 are used. Thus, even if data communication between the evaluation device 40, the first-attribute providing device 20, and the second-attribute providing device 30 is monitored, it is not possible to know which of the first-attribute providing device 20 and the second-attribute providing device 30 holds the actual attribute information. This makes it difficult for the third party to know which attribute providing device holds attribute information on each user. As described above, it is possible to reduce the risk of leakage of information, by using the pseudo attribute value and the attribute evaluation information outputted from the processing device 10 according to the first exemplary embodiment.

It should be noted that, in the flowchart shown in FIG. 3, S33 and S32 may be processed in parallel, or the process order of S33 and S32 may be changed. Further, of the processes in S39, the output of the pseudo attribute value may be performed before S39, provided that it is performed after the second-attribute providing device 30 is determined in S36.

[Second Exemplary Embodiment]

Figure 4:
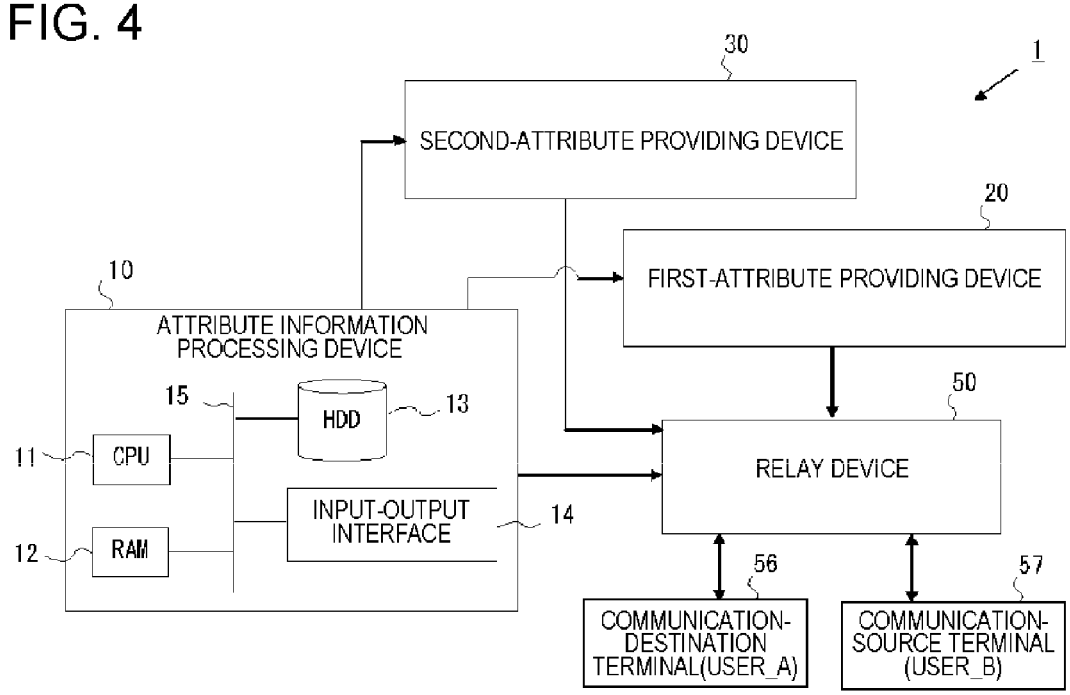
FIG. 4 is a diagram illustrating an example of a configuration of an attribute information evaluation system according to a second exemplary embodiment.

FIG. 4 is a diagram illustrating an example of a configuration of an attribute information evaluation system according to a second exemplary embodiment. An attribute information evaluation system 1 according to the second exemplary embodiment includes a relay device 50 instead of the evaluation device 40 in the first exemplary embodiment. In the attribute information evaluation system 1 according to the second exemplary embodiment, in the case where a user B that uses a communication-source terminal 57 makes a request to communicate with a user A that uses a communication-destination terminal 56, a determination is made as to whether the requested communication is permitted on the basis of a result of evaluation for attribute information on the user A and attribute information on the user B.

Prior to this determination, the user A inputs attribute information on the user A into a processing device 10 in advance. In the second exemplary embodiment, the attribute information on the user A serves as a condition for limiting a party who can communicate with the user A. Hereinafter, the attribute information on the user A inputted into the processing device 10 may be also referred to as condition attribute information, and the attribute information on the user B to be compared with the attribute information on the user A may be also referred to as target attribute information. Below, each device constituting the attribute information evaluation system 1 will be described while a focus of the description is being placed mainly on differences from those in the first exemplary embodiment.

[Attribute Information Processing Device]

A processing device 10 according to the second exemplary embodiment may have a configuration similar to that in the first exemplary embodiment. In the second exemplary embodiment, an example will be given in which a generating unit 104 in the processing device 10 generates plural pieces of attribute evaluation information. In the second exemplary embodiment, the processing device 10 converts the condition attribute information into attribute evaluation information, and a conversion identifier (hereinafter, referred to as a conversion ID) for identifying each conversion is used. Further, in the first exemplary embodiment, an example in which the attribute value and the real attribute value correspond to each other on a one-to-one basis has been given. However, in the second exemplary embodiment, an example will be given in which plural real attribute values are used for one attribute value.

Figure 5:
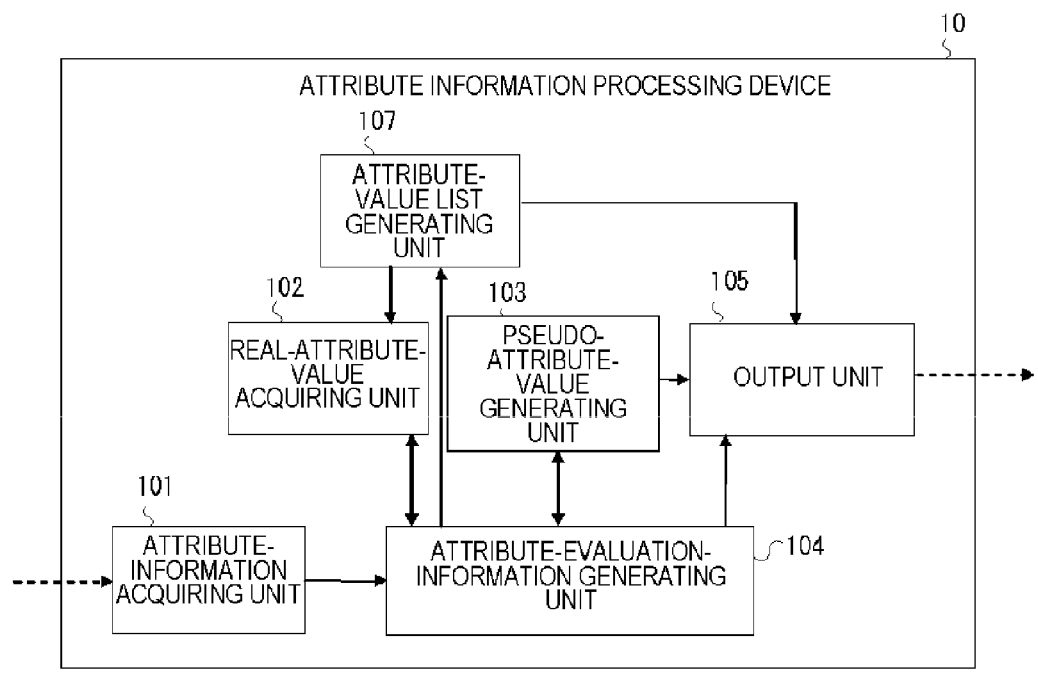
FIG. 5 is a schematic view illustrating an example of a process configuration of an attribute information processing device according to the second exemplary embodiment.

FIG. 5 is a schematic view illustrating an example of a process configuration of the processing device 10 according to the second exemplary embodiment. As illustrated in FIG. 5, in addition to the configuration of the first exemplary embodiment, the processing device 10 according to the second exemplary embodiment further includes an attribute-value list generating unit (hereinafter, also referred to as a list generating unit) 107.

The attribute information acquiring unit 101 acquires the condition attribute information inputted by the user A, and a terminal identifier (hereinafter, referred to as a terminal ID) for identifying a terminal that the user A uses. The attribute information acquiring unit 101 sends the terminal ID and the condition attribute information to the generating unit 104. As described above, the second exemplary embodiment uses the terminal ID for a terminal used by each user as information used for identifying each user. For example, the user A is identified on the basis on a terminal ID (USER_A) of the communication-destination terminal 56, and the user B is identified on the basis of a terminal ID (USER_B) of the communication-source terminal 57. Note that, instead of the terminal ID, it may be possible to employ a user identifier for identifying the user A.

Upon acquiring the condition attribute information inputted by the user A from the attribute information acquiring unit 101, the generating unit 104 generates a conversion ID. The conversion ID is identification information for identifying conversion from the condition attribute information to the attribute evaluation information.

The list generating unit 107 identifies all the attribute values that the attribute type of the condition attribute information can take, determines real attribute values corresponding to the identified attribute values, and generates an attribute-value list in which the identified attribute values are each associated with the determined real attribute values. For example, in the case where the condition attribute information is "preference=game," all the attribute values ("game," "sports" and the like) for a attribute type "preference" are identified, and real attribute values ("1," "2" and the like) for the attribute values are determined. For the attribute-value list in this example, (game"—"1," "sports"—"2" and the like) is generated.

The list generating unit 107 sends the generated attribute-value list to the real-attribute-value acquiring unit 102. With this configuration, the real-attribute-value acquiring unit 102 acquires the real attribute values corresponding to the attribute values of the condition attribute information from the attribute-value list. Note that FIG. 5 shows an example in which the real-attribute-value acquiring unit 102 and the list generating unit 107 are configured as different processing units. However, these units are configured as one processing unit.

Further, the list generating unit 107 sends the generated attribute-value list, the attribute types of this attribute-value list, and the conversion ID to the output unit 105. Then, the output unit 105 outputs the attribute-value list, the attribute type and the conversion ID so as to store these pieces of information in the first-attribute providing device 20. At this time, the output unit 105 may send these pieces of information directly to the first-attribute providing device 20. The output unit 105 has acquired the information on the first-attribute providing device 20 from the generating unit 104.

The pseudo-attribute-value generating unit 103 generates a pseudo attribute value corresponding to the attribute value of the condition attribute information, and sends the pseudo attribute value and the conversion ID to the output unit 105. Then, the output unit 105 outputs the pseudo attribute value and the conversion ID so as to store these pieces of information in the second-attribute providing device 30. At this time, the output unit 105 may send these pieces of information directly to the second-attribute providing device 30. The output unit 105 has acquired the information on the second-attribute providing device 30 from the generating unit 104.

The generating unit 104 generates attribute evaluation information for the condition attribute information in a manner similar to the first exemplary embodiment. The generating unit 104 sends to the output unit 105 the attribute evaluation information, the conversion ID, and the terminal ID of the communication-destination terminal 56 for identifying a user who inputs the condition attribute information. The output unit 105 sends these pieces of information to the relay device 50.

[First-attribute Providing Device and Second-attribute Providing Device]

Figure 6:
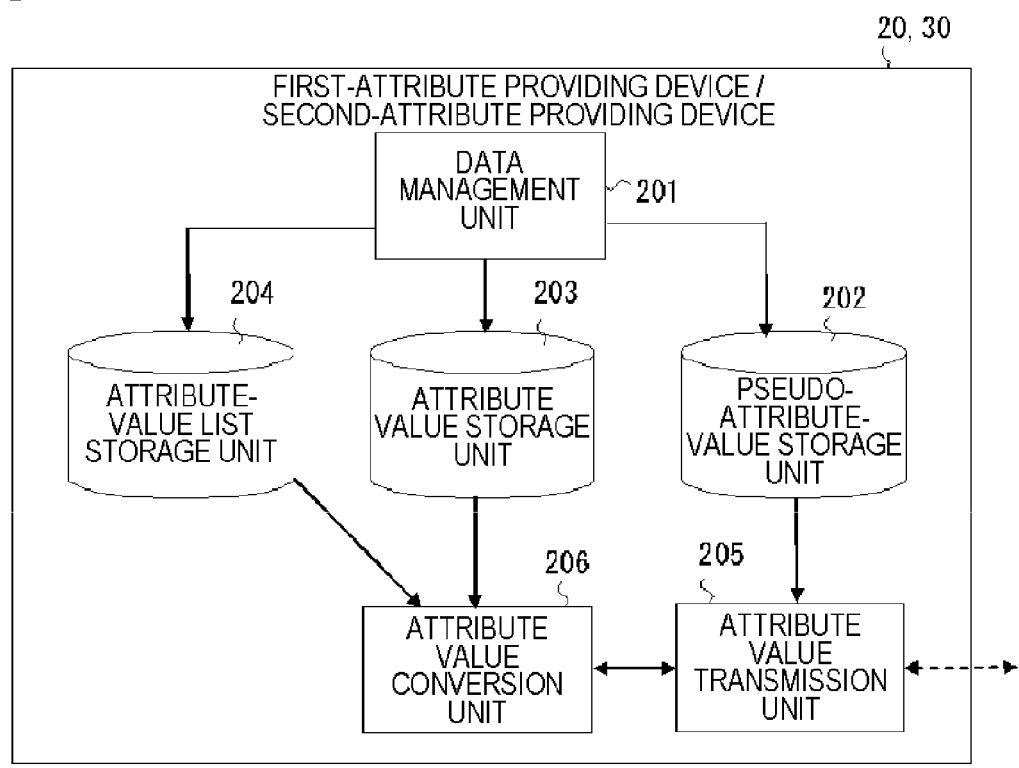
FIG. 6 is a schematic view illustrating an example of a process configuration of a first-attribute providing device or second-attribute providing device according to the second exemplary embodiment.

FIG. 6 is a schematic view illustrating an example of a process configuration of the first-attribute providing device 20 and the second-attribute providing device 30 according to the second exemplary embodiment. In the second exemplary embodiment, the first-attribute providing device 20 and the second-attribute providing device 30 have the same process configuration, and data stored therein are different between the first-attribute providing device 20 and the second-attribute providing device 30. Of the two attribute providing devices, one of them stores the attribute-value list and the attribute information on each user, and the other stores the pseudo attribute value. As in the first exemplary embodiment, in the second exemplary embodiment, an example is given in which the first-attribute providing device 20 stores the former, and the second-attribute providing device 30 stores the latter. In the following descriptions, the first-attribute providing device 20 and the second-attribute providing device 30 are not specifically separated and are collectively referred to as a attribute providing device, except when these need to be specifically separated.

As illustrated in FIG. 6, the attribute providing device according to the second exemplary embodiment includes a data management unit 201, a pseudo-attribute-value storage unit 202, an attribute value storage unit 203, an attribute-value list storage unit 204, an attribute value transmission unit 205, and an attribute value conversion unit 206.

FIG. 7 is a diagram illustrating an example of the pseudo-attribute-value storage unit 202. As illustrated in FIG. 7, the pseudo-attribute-value storage unit 202 stores the conversion IDs and the pseudo attribute values outputted from the output unit 105 of the processing device 10 in a manner such that they are associated with each other.

FIG. 8 is a diagram illustrating an example of the attribute value storage unit 203. The attribute value storage unit 203 stores at least one piece of attribute information on each user. In the example illustrated in FIG. 8, the correspondence relationship between the terminal ID of a terminal used by each user, the attribute type, and the attribute value is stored. For example, two pieces of attribute information "preference=game" and "location=Tamachi" are stored for a terminal ID "USER_A."

FIG. 9 is a diagram illustrating an example of the attribute-value list storage unit 204. As illustrated in FIG. 9, the attribute-value list storage unit 204 stores the attribute-value lists, the conversion IDs and the attribute types outputted from the output unit 105 of the processing device 10 in a manner such that they are associated with each other.

The data management unit 201 manages the pseudo-attribute-value storage unit 202, the attribute value storage unit 203 and the attribute-value list storage unit 204. More specifically, the data management unit 201 receives the attribute-value list, the conversion IDs and the attribute types outputted from the output unit 105 of the processing device 10, and stores these pieces of information in the attribute-value list storage unit 204. Further, the data management unit 201 receives the conversion ID and the pseudo attribute value outputted from the output unit 105 of the processing device 10, and stores these pieces of information in the pseudo-attribute-value storage unit 202.

Further, the data management unit 201 receives data from other devices, and updates the attribute value storage unit 203 with the received data. This exemplary embodiment does not limit the acquisition source or updating timing of the data stored in the attribute value storage unit 203. The attribute value storage unit 203 may store data inputted through an input unit of the attribute providing device.

The attribute value transmission unit 205 receives from the relay device 50 a request to send the attribute value together with the terminal ID of the communication-source terminal 57, the attribute type, and the conversion ID, and sends to the relay device 50 the pseudo attribute value identified by the conversion ID, or the real attribute value identified by the conversion ID, the attribute type, and the terminal ID. In the case where the attribute providing device is the first-attribute providing device 20, the attribute value transmission unit 205 sends back the real attribute value, whereas, in the case where the attribute providing device is the second-attribute providing device 30, the attribute value transmission unit 205 sends back the pseudo attribute value. In Example of Operation below, a specific description will be made of processes performed by the attribute value transmission unit 205.

In the case where the pseudo-attribute-value storage unit 202 does not store any record containing a target conversion ID, the attribute value conversion unit 206 operates when the attribute value transmission unit 205 receives from the relay device 50 the request to send the attribute value. The attribute value conversion unit 206 acquires the real attribute value identified by the terminal ID of the communication-source terminal 57, the attribute type and the conversion ID from the attribute value storage unit 203 and the attribute-value list storage unit 204, and sends back the acquired real attribute value to the attribute value transmission unit 205. In Example of Operation below, a specific description will be made of processes performed by the attribute value conversion unit 206.

[Relay Device]

Figure 10:
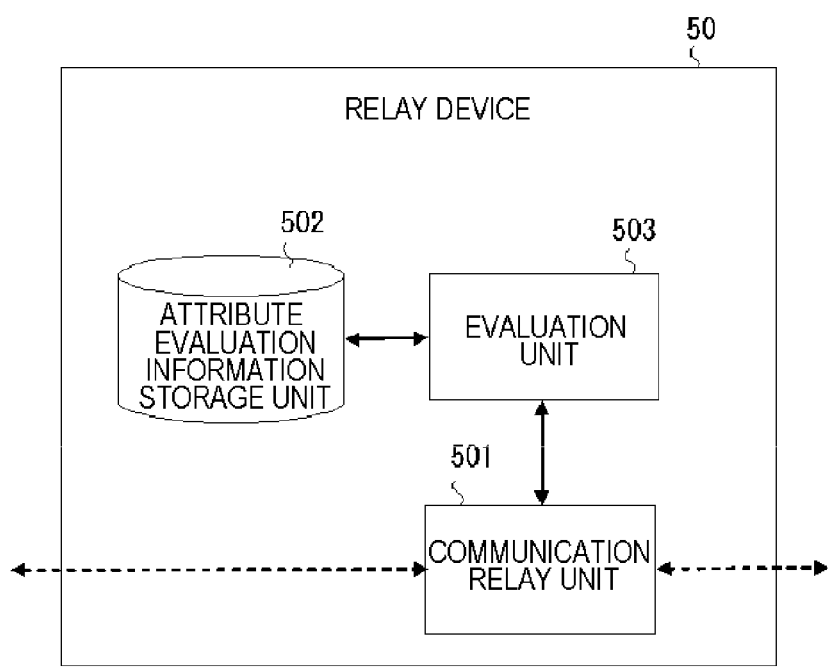
FIG. 10 is a schematic view illustrating an example of a process configuration of a relay device according to the second exemplary embodiment.

FIG. 10 is a schematic view illustrating an example of a process configuration of the relay device 50 according to the second exemplary embodiment. As illustrated in FIG. 10, the relay device 50 includes a communication relay unit 501, an attribute evaluation information storage unit 502, and an evaluation unit 503. In the relay device 50, these processing units are configured, for example, as hardware circuits such as an IC chip. The above-described processing units may be realized by configuring the relay device 50 to include a CPU, a memory, and an input-output interface, and causing the CPU to run a program stored in the memory. This exemplary embodiment does not limit the hardware configuration of the relay device 50.

The communication relay unit 501 is connected through a network to the communication-destination terminal 56 and the communication-source terminal 57 in a manner that they can communicate with each other, and controls communication between the communication-destination terminal 56 and the communication-source terminal 57. The network includes a public network such as the Internet, a wide area network (WAN), a local area network (LAN), and a wireless communication network. Further, the communication between the communication-destination terminal 56 and the communication-source terminal 57 may be a packet communication, or may be a voice communication. For example, in the case where the voice communication is controlled, the communication relay unit 501 operates as a session initiation protocol (SIP) server. This exemplary embodiment does not limit the form of the network, communication protocols, or communication form.

Upon receiving from the communication-source terminal 57 a request to communicate with the communication-destination terminal 56, the communication relay unit 501 determines whether to permit the requested communication on the basis of the evaluation results obtained from the evaluation unit 503. If permitting the communication, the communication relay unit 501 establishes the communication connection between the communication-destination terminal 56 and the communication-source terminal 57. On the other hand, if not permitting the communication, the communication relay unit 501 does not establish the communication connection. With this configuration, the communication-source terminal 57 cannot communicate with the communication-destination terminal 56 if the communication is not permitted. Note that this exemplary embodiment does not limit a method of establishing the communication connection, and it may be possible to simply switch between transmitting or not transmitting, to the communication-destination terminal 56, particulars of communication transmitted from the communication-source terminal 57 together with the communication request.

FIG. 11 is a diagram illustrating an example of the attribute evaluation information storage unit 502. The attribute evaluation information storage unit 502 stores the attribute evaluation information in a manner such that the conversion IDs and the terminal IDs are associated with each other. The terminal ID stored in the attribute evaluation information storage unit 502 is a terminal ID of the communication-destination terminal 56 for identifying a user who inputs the condition attribute information, which is the source of the attribute evaluation information. The data stored in the attribute evaluation information storage unit 502 are data outputted from the output unit 105 of the processing device 10.

The evaluation unit 503 receives the terminal ID of the communication-source terminal 57, which requests the communication, and the terminal ID of the communication-destination terminal 56, and makes an evaluation of whether the condition attribute information inputted by the user A of the communication-destination terminal 56 matches the attribute information on the user B of the communication-source terminal 57. More specifically, the evaluation unit 503 extracts a record containing the terminal ID of the communication-destination terminal 56 from the attribute evaluation information storage unit 502, and acquires the attribute evaluation information and the conversion ID from the extracted record.

The evaluation unit 503 employs a manner similar to that of the evaluation device 40 in the first exemplary embodiment to evaluate the attribute evaluation information. When evaluating the attribute evaluation information, the evaluation unit 503 according to the second exemplary embodiment sends the information on the attribute type as well as the conversion ID and the terminal ID of the communication-destination terminal 56 to the first-attribute providing device 20 and the second-attribute providing device 30. The evaluation unit 503 sends to the communication relay unit 501 a result of evaluation of whether the condition attribute information on the user A of the communication-destination terminal 56 matches the attribute information on the user B of the communication-source terminal 57.

[Example of Operation]

Next, an example of operations performed by the attribute information evaluation system 1 according to the second exemplary embodiment will be described. This description includes a process of registering the condition attribute information on the user A of the communication-destination terminal 56 to the relay device 50, and a process performed when a request to communicate with the user A of the communication-destination terminal 56 is received from the user B of the communication-source terminal 57.

Figure 12:
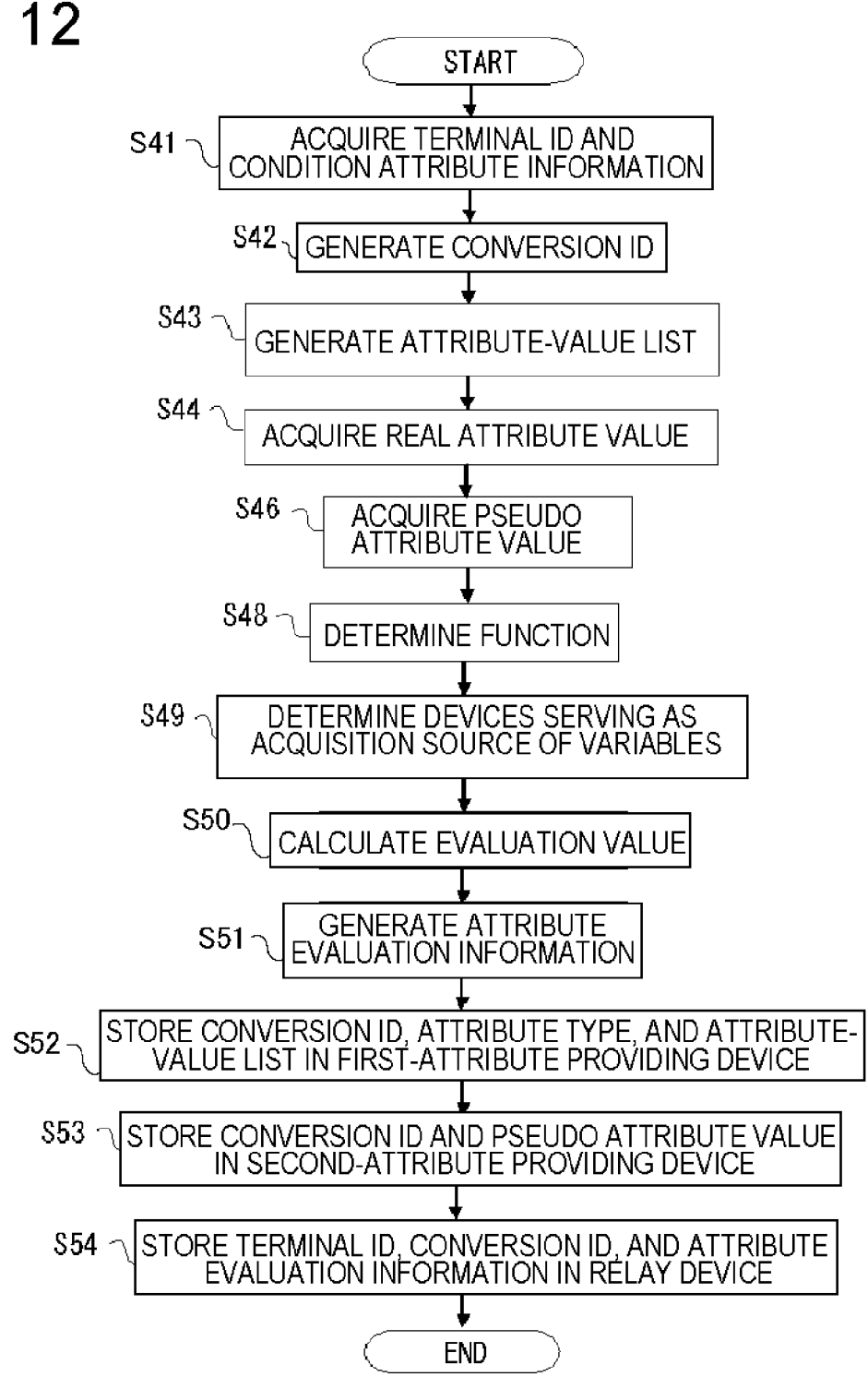
FIG. 12 is a flowchart showing an example of operations for registering condition attribute information into a relay device according to the second exemplary embodiment.

FIG. 12 is a flowchart showing an example of operations of registering the condition attribute information to the relay device 50 in the second exemplary embodiment. In this description, an example will be given in which the user A of the communication-destination terminal 56 inputs condition attribute information "preference=game" into the processing device 10. Further, the user A is identified by a terminal ID "USER_A." At this time, the attribute information acquiring unit 101 of the processing device 10 acquires the terminal ID "USER_A" of the communication-destination terminal 56 and the condition attribute information "preference=game" of the user A (S41). The attribute information acquiring unit 101 sends the terminal ID and the condition attribute information to the generating unit 104.

Upon receiving the terminal ID and the condition attribute information, the generating unit 104 generates a conversion ID (S42). The generating unit 104 sends the condition attribute information and the conversion ID to the list generating unit 107.

Upon receiving the condition attribute information and the conversion ID from the generating unit 104, the list generating unit 107 generates an attribute-value list corresponding to the attribute type of the condition attribute information and the conversion ID (S43). More specifically, the list generating unit 107 extracts the attribute type from the condition attribute information, and acquires all the attribute values that this attribute type can take. In this example, an attribute type "preference" is extracted from the condition attribute information "preference=game," and all the attribute values ("game," "sports," "reading books" and the like) concerning this attribute type "preference" are acquired. For example, all the attribute values that the attribute type can take are kept in the list generating unit 107 in advance.

The list generating unit 107 generates real attribute values for all the acquired attribute values. In this exemplary embodiment, for example, "1" is generate for the "game," "2" is generated for the "sports," and "3" is generated for the "reading books." The list generating unit 107 generates an attribute-value list containing a correspondence relationship between the attribute values and the real attribute values generated above. In this example, ("game"—"1," "sports"—"2," "reading books"—"3" and the like) is generated as the attribute-value list. The list generating unit 107 sends the thus generated attribute-value list and condition attribute information to the real-attribute-value acquiring unit 102, and further sends the attribute-value list, the conversion ID, and the attribute type to the output unit 105.

Upon receiving the attribute-value list and the condition attribute information from the list generating unit 107, the real-attribute-value acquiring unit 102 acquires real attribute values corresponding to the attribute values of the condition attribute information from the attribute-value list (S44). The real-attribute-value acquiring unit 102 sends the acquired real attribute values to the generating unit 104. In this example, a attribute value "game" is extracted from the condition attribute information "preference=game," and a real attribute value "1" corresponding to the attribute value "game" is acquired from the attribute-value list ("game"—"1," "sports"—"2," "reading books"—"3" and the like).

Upon receiving the real attribute value from the real-attribute-value acquiring unit 102, the generating unit 104 sends the condition attribute information and the conversion ID to the pseudo-attribute-value generating unit 103. Upon receiving the condition attribute information and the conversion ID from the generating unit 104, the pseudo-attribute-value generating unit 103 acquires a pseudo attribute value corresponding to these pieces of information (S46). The pseudo attribute value is acquired in a manner similar to that described in the first exemplary embodiment. In this example, a pseudo attribute value "3" is acquired for the condition attribute information "preference=game." The pseudo-attribute-value generating unit 103 sends the acquired pseudo attribute value to the generating unit 104, and further, sends the pseudo attribute value and the conversion ID to the output unit 105.

Upon receiving the real attribute value and the pseudo attribute value from the real-attribute-value acquiring unit 102 and the pseudo-attribute-value generating unit 103, the generating unit 104 generates attribute evaluation information for the condition attribute information (S48, S49, S50, and S51). Processes S48, S49, S50, and S51 are similar to processes in the first exemplary embodiment (S35, S36, S37, and S38 in FIG. 3), and thus, detained descriptions will not be repeated. In this example, the generating unit 104 generates "first-attribute providing device 20.preference+second-attribute providing device 30.preference=4" as the attribute evaluation information. The generating unit 104 sends the thus generated attribute evaluation information, the conversion ID, and the terminal ID of the communication-destination terminal 56 to the output unit 105.

Upon receiving the attribute-value list, the conversion ID, and the attribute type from the list generating unit 107, the output unit 105 causes an attribute providing device (first-attribute providing device 20) identified on the basis of information separately notified by the generating unit 104 to store these pieces of information (S52). In this example, the attribute-value list storage unit 204 of the first-attribute providing device 20 stores the attribute-value list ("game"—"1," "sports"—"2," "reading books"—"3" and the like), the conversion ID, and the attribute type "preference" outputted from the output unit 105.

Further, the output unit 105 causes an attribute providing device (second-attribute providing device 30) identified on the basis of information separately notified by the generating unit 104 to store the conversion ID and the pseudo attribute value (S53). In this example, the pseudo-attribute-value storage unit 202 of the second-attribute providing device 30 stores the conversion ID and the pseudo attribute value "3" outputted from the output unit 105.

Yet further, the output unit 105 causes the relay device 50 to store the conversion ID, the terminal ID, and the attribute evaluation information acquired by the generating unit 104 (S54). In this example, the attribute evaluation information storage unit 502 of the relay device 50 stores the conversion ID, the terminal ID "USER_A," and the attribute evaluation information "first-attribute providing device 20.preference+second-attribute providing device 30.preference=4."

It should be noted that, in the flowchart shown in FIG. 12, processes S43 and S44 and process S46 may be performed in parallel, or the order of these processes may be changed. Further, S52 and S53 may be performed at any time after the first-attribute providing device 20 and the second-attribute providing device 30 are determined in S49.

Figure 13:
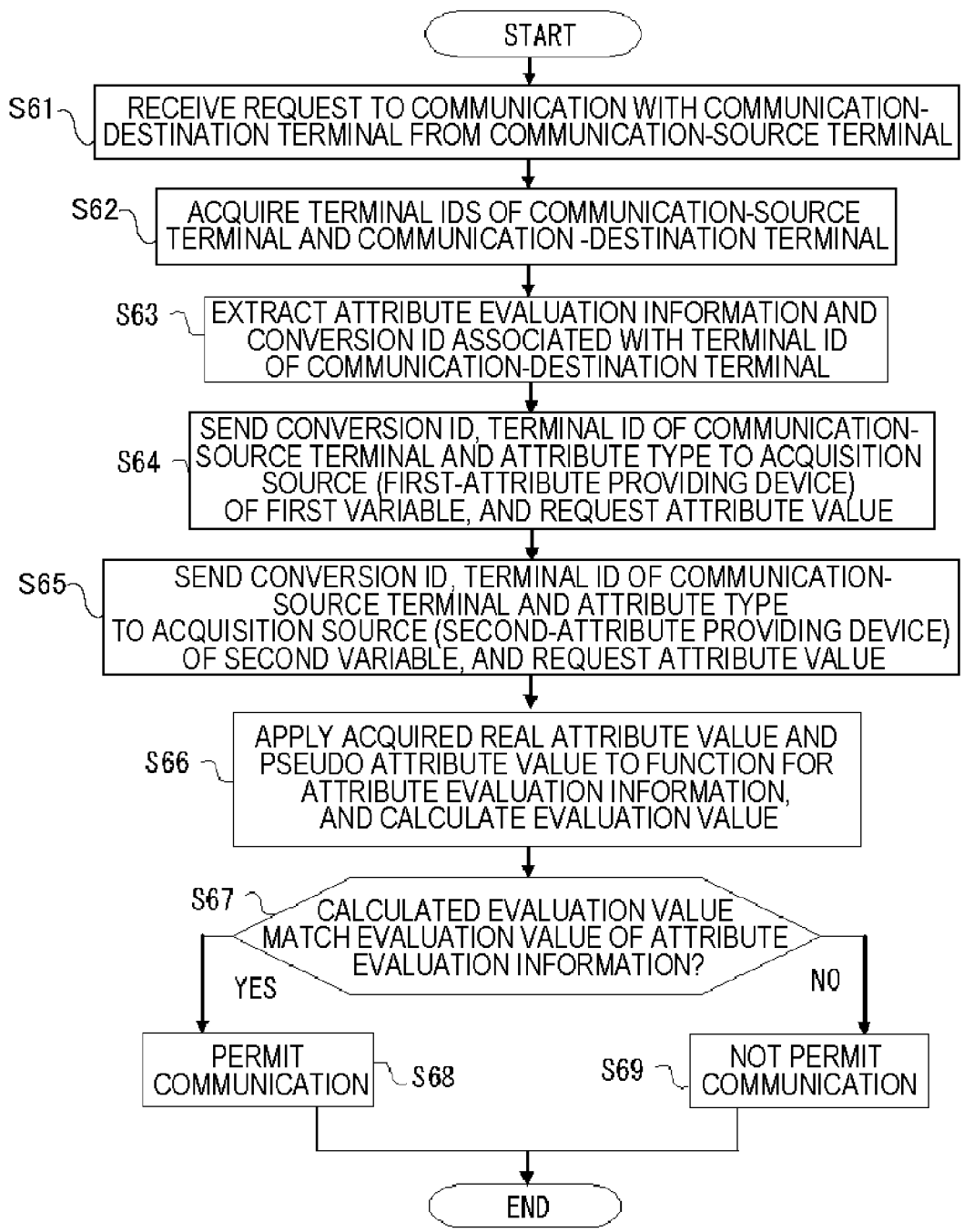
FIG. 13 is a flowchart showing an example of operations performed when a request for communicating with a user of a communication-destination terminal is received from a user of a communication-source terminal according to second exemplary embodiment.

FIG. 13 is a flowchart showing an example of operations according to the second exemplary embodiment performed when a request to communicate with the user A of the communication-destination terminal 56 is received from the user B of the communication-source terminal 57. In this exemplary embodiment, an example will be given in which the condition attribute information on the user A "USER_A" of the communication-destination terminal 56 is "preference=game," and the target attribute information on the user B "USER_B" of the communication-source terminal 57 is "preference=sports." In this example, the relay device 50, the first-attribute providing device 20, and the second-attribute providing device 30 store the following data.

The attribute evaluation information storage unit 502 of the relay device 50 has already stored the attribute evaluation information "first-attribute providing device 20.preference+second-attribute providing device 30.preference=4" generated from the condition attribute information "preference=game" in a manner such that it is associated with the conversion ID "H001" and the terminal ID "USER_A." The attribute value storage unit 203 of the first-attribute providing device 20 stores the attribute type "preference" and the attribute value "sports" in a manner such that they are associated with the terminal ID "USER_B." In association with the conversion ID "H001" and the attribute type "preference," the attribute-value list storage unit 204 of the first-attribute providing device 20 stores the attribute-value list ("game"—"1," "sports"—"2" and the like). In association with the conversion ID "H001," the pseudo-attribute-value storage unit 202 of the second-attribute providing device 30 stores the pseudo attribute value "3."

The communication relay unit 501 of the relay device 50 receives from the user B of the communication-source terminal 57 a request to communicate with the user A of the communication-destination terminal 56 (S61). The communication relay unit 501 acquires the terminal ID of the communication-source terminal 57 and the terminal ID of the communication-destination terminal 56 from this communication request (S62). In this example, "USER_B" is acquired as the terminal ID of the communication-source terminal 57, and "USER_A" is acquired as the terminal ID of the communication-destination terminal 56.

The communication relay unit 501 sends the terminal ID of the communication-source terminal 57 and the terminal ID of the communication-destination terminal 56 to the evaluation unit 503, and requests the evaluation unit 503 to make an evaluation. The evaluation unit 503 extracts the attribute evaluation information and conversion ID associated with the terminal ID of the communication-destination terminal 56 from the attribute evaluation information storage unit 502 (S63). In this example, the conversion ID "H001" and the attribute evaluation information "first-attribute providing device 20.preference+second-attribute providing device 30.preference=4," each of which is associated with the terminal ID "USER_A" of the communication-destination terminal 56, are extracted.

The evaluation unit 503 sends the conversion ID, the terminal ID of the communication-source terminal 57 and the attribute type to the first-attribute providing device 20 on the basis of the acquisition-source information on the first variable contained in the attribute evaluation information, thereby requesting the attribute value (S64). In this example, the conversion ID "H001," the terminal ID "USER_B," and the attribute type "preference" are sent to the first-attribute providing device 20.

Similarly, the evaluation unit 503 sends the conversion ID, the terminal ID of the communication-source terminal 57 and the attribute type to the second-attribute providing device 30 on the basis of the acquisition-source information on the second variable contained in the attribute evaluation information, thereby requesting the attribute value (S65). In this example, the conversion ID "H001," the terminal ID "USER_B," and the attribute type "preference" are sent to the second-attribute providing device 30.

With the request described above, the evaluation unit 503 acquires attribute values (the real attribute value and the pseudo attribute value) from the first-attribute providing device 20 and the second-attribute providing device 30. In this example, the evaluation unit 503 acquires real attribute value "2" corresponding to the attribute value "sports" from the first-attribute providing device 20, and acquires pseudo attribute value "3" corresponding to the conversion ID "H001" from the second-attribute providing device 30. The evaluation unit 503 applies these attribute values to the first variable and the second variable of the function for the attribute evaluation information, thereby obtaining an evaluation value as a calculation result of the function (S66). In this example, the evaluation unit 503 acquires evaluation value "5" (=2+3).

The evaluation unit 503 compares the thus obtained evaluation value with the evaluation value contained in the attribute evaluation information (S67). If both of the values match (YES in S67), the evaluation unit 503 sends the evaluation result indicating that both of the values match to the communication relay unit 501. On the other hand, if both of the values do not match (NO in S67), the evaluation unit 503 sends the evaluation result indicating that both of the values do not match to the communication relay unit 501. In this example, the evaluation value contained in the attribute evaluation information is "4," whereas the calculated value is "5," and both do not match (NO in S67). Thus, the evaluation unit 503 sends the evaluation result indicating that both do not match to the communication relay unit 501.

It should be noted that, in this example, as described above, the condition attribute information on the user A "USER_A" of the communication-destination terminal 56 is "preference=game" and the target attribute information on the user B "USER_B" of the communication-source terminal 57 is "preference=sports," both of which attribute information do not match with each other. Thus, it can be understood that a similar result can be obtained in the evaluation that employs the attribute evaluation information according to the second exemplary embodiment.

Upon receiving the evaluation result received from the evaluation unit 503, the communication relay unit 501 determines on the basis of the evaluation result whether or not to permit the communication request. More specifically, if the evaluation result indicates matching, the communication relay unit 501 permits the communication (S68), whereas, if the evaluation result indicates not matching, the communication relay unit 501 does not permit the communication (S69). Thus, the user B of the communication-source terminal 57 cannot communicate with the user A of the communication-destination terminal 56.

As described above, in the attribute information evaluation system 1 according to the second exemplary embodiment, condition attribute information on each user that can be a communication destination is inputted into the processing device 10, and attribute evaluation information is generated on the basis of the condition attribute information. The relay device 50 stores the attribute evaluation information generated in the processing device 10 together with the conversion ID, and the terminal ID indicating each user. Then, when a request to communicate with a user of a communication destination is sent from a user of a communication source to the relay device 50, the relay device 50 uses the attribute evaluation information on the user of the communication source that has been already stored therein to determine whether the attribute information on the user of the communication source matches attribute information on the user of the communication destination.

Thus, as in the evaluation device 40 in the first exemplary embodiment, according to the second exemplary embodiment, the relay device 50 that evaluates the attribute information cannot know the attribute information on the user of the communication source and the attribute information on the user of the communication destination. Further, even if the attribute evaluation information leaks from the relay device 50 and a third party obtains the attribute evaluation information, the third party cannot know the attribute information, which is the source of the attribute evaluation information. Yet further, as in the first exemplary embodiment, according to the second exemplary embodiment, it is possible to make it difficult for the third party to know where attribute information on each user exists. As described above, with the second exemplary embodiment, as with the first exemplary embodiment, it is possible to reduce the risk of the leakage of information.

It should be noted that, in the example of operations described above, no specific description has been made of a case where, in the process of S63, the attribute evaluation information and the conversion ID associated with the terminal ID of the communication-destination terminal 56 are plurally extracted from the attribute evaluation information storage unit 502. In the case where plural groups of the attribute evaluation information and the conversion ID are extracted, the processes S64, S65, and S66 are performed for each of the extracted plural pieces of the attribute evaluation information. In this case, if all the calculated evaluation values match the evaluation values of the attribute evaluation information, it is determined that the result of process S67 is "match" (YES).

Figure 14:
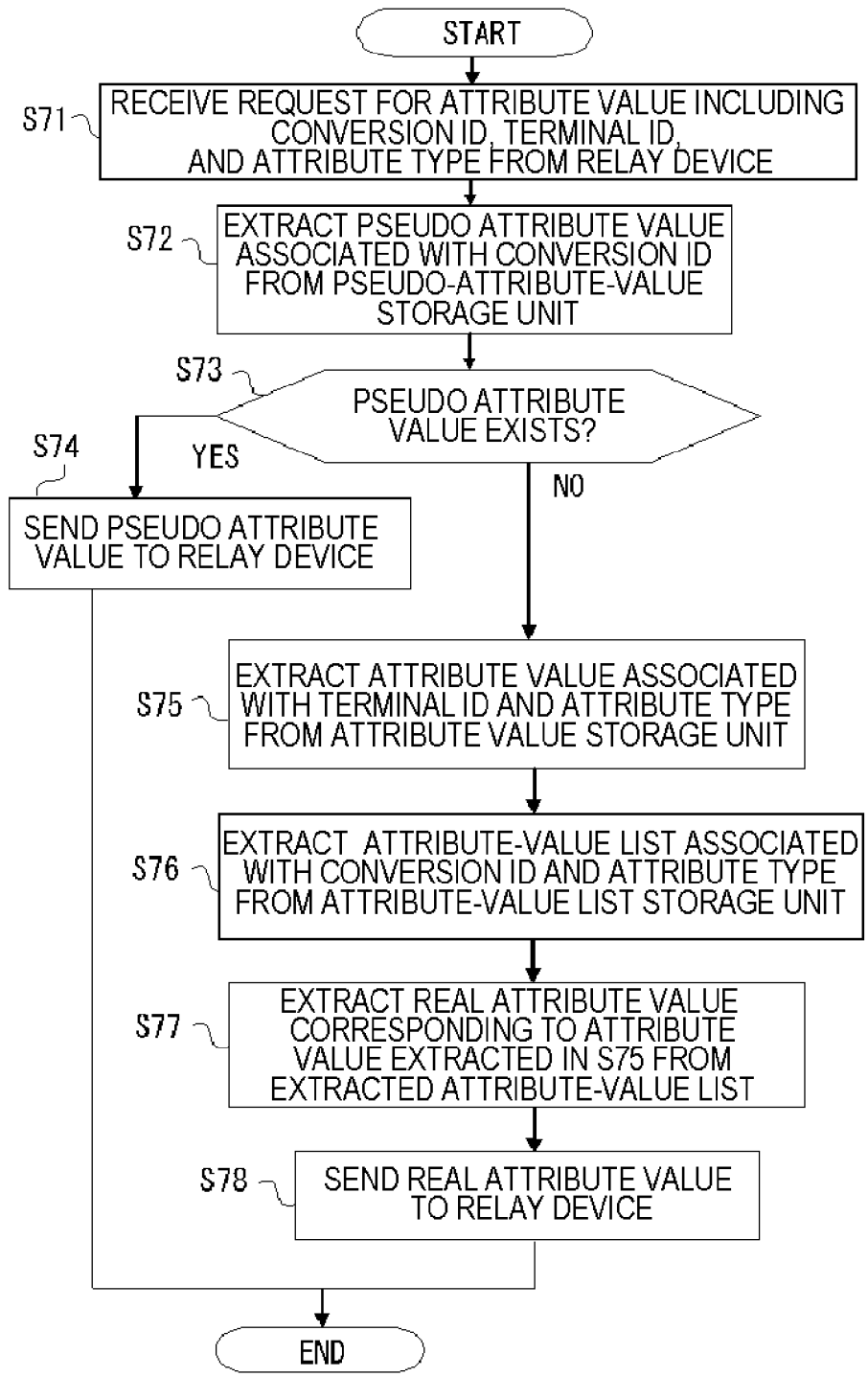
FIG. 14 is a flowchart showing an example of operations performed by the first-attribute providing device and the second-attribute providing device according to the second exemplary embodiment.

Next, with reference to FIG. 14, a description will be made of an example of operations performed by the first-attribute providing device 20 and the second-attribute providing device 30 that are requested to supply an attribute value in S64 and S65 shown in the flowchart of FIG. 13. FIG. 14 is a flowchart showing an example of operations performed by the first-attribute providing device 20 and the second-attribute providing device 30 according to the second exemplary embodiment. Below, description will be made using the example same as that used in the description of the flowchart of FIG. 13.

In the attribute providing device, the attribute value transmission unit 205 receives the attribute value request containing the conversion ID, the terminal ID of the communication-source terminal 57 and the attribute type from the relay device 50 (S71). In this example, the first-attribute providing device 20 receives a conversion ID "H001," a terminal ID "USER_B" and an attribute type "preference," and the second-attribute providing device 30 receives a conversion ID "H001," a terminal ID "USER_B," and an attribute type "preference."

The attribute value transmission unit 205 extracts a pseudo attribute value associated with the conversion ID from the pseudo-attribute-value storage unit 202 (S72). In the case where the pseudo-attribute-value storage unit 202 stores a corresponding pseudo attribute value (S73; YES), the attribute value transmission unit 205 sends the extracted pseudo attribute value to the relay device 50 (S74). The case where the pseudo-attribute-value storage unit 202 stores the corresponding pseudo attribute value (S73; YES) represents a case where the attribute providing device is the second-attribute providing device 30.

Next, a description will be made of an example of operations performed in the case where the attribute providing device is the first-attribute providing device 20. In the case where the pseudo-attribute-value storage unit 202 does not store the corresponding pseudo attribute value (S73; NO), the attribute value transmission unit 205 sends the conversion ID, the terminal ID of the communication-source terminal 57, and the attribute type to the attribute value conversion unit 206.

The attribute value conversion unit 206 extracts an attribute value associated with the terminal ID and the attribute type from the attribute value storage unit 203 (S75). In other words, the attribute value conversion unit 206 determines attribute information corresponding to the attribute type of the communication source user (user B), and extracts an attribute value of the determined attribute information. In this example, an attribute value "sports" associated with the terminal ID "USER_B" and the attribute type "preference" is extracted.

Next, the attribute value conversion unit 206 extracts an attribute-value list associated with the conversion ID and the attribute type from the attribute-value list storage unit 204 (S76). In this example, the attribute-value list ("game"—"1" and "sports"—"2") associated with a conversion ID "H001" and an attribute type "preference" is extracted.

The attribute value conversion unit 206 extracts from the extracted attribute-value list a real attribute value corresponding to the attribute value extracted in S75 (S77). In this example, a real attribute value "2" corresponding to the attribute value "sports" is extracted from the attribute-value list ("game"—"1" and "sports"—"2"). The extracted real attribute value is sent to the attribute value transmission unit 205, and the attribute value transmission unit 205 sends this real attribute value to the relay device (S78).

As described above, in the second exemplary embodiment, the attribute-value list is generated when the processing device 10 generates the attribute evaluation information on the basis of the condition attribute information, and this attribute-value list is stored in the first-attribute providing device 20. At this time, the attribute-value list is stored in a manner that the attribute-value list can be identified with the conversion ID. When receiving a request for the attribute value from the relay device 50, the first-attribute providing device 20 determines attribute information corresponding to the request target from stored attribute information on each user, extracts a real attribute value corresponding to the attribute value of the determined attribute information from the attribute-value list, and sends the extracted real attribute value to the relay device 50. At this time, the first-attribute providing device 20 determines the attribute-value list on the basis of the conversion ID contained in the request from the relay device 50.

As described above, in the second exemplary embodiment, real attribute values can be shared between the processing device 10 and the first-attribute providing device 20 through the conversion ID and the attribute-value list. Further, in terms of the same attribute type, it is possible to generate different attribute-value lists for each conversion ID. For example, in connection with the attribute type "preference," ("game"—"1," "sports"—"2" and the like) can be generated for the attribute-value list of the conversion ID "H001," and ("game"—"21," "sports"—"25" and the like) can be generated for the attribute-value list of the conversion ID "H005."

With the mode described above, plural real attribute values can be allocated for one attribute value, which makes it further difficult for the third party to know the attribute value, thereby further reducing the risk of the leakage of information.

[Third Exemplary Embodiment]

Figure 15:
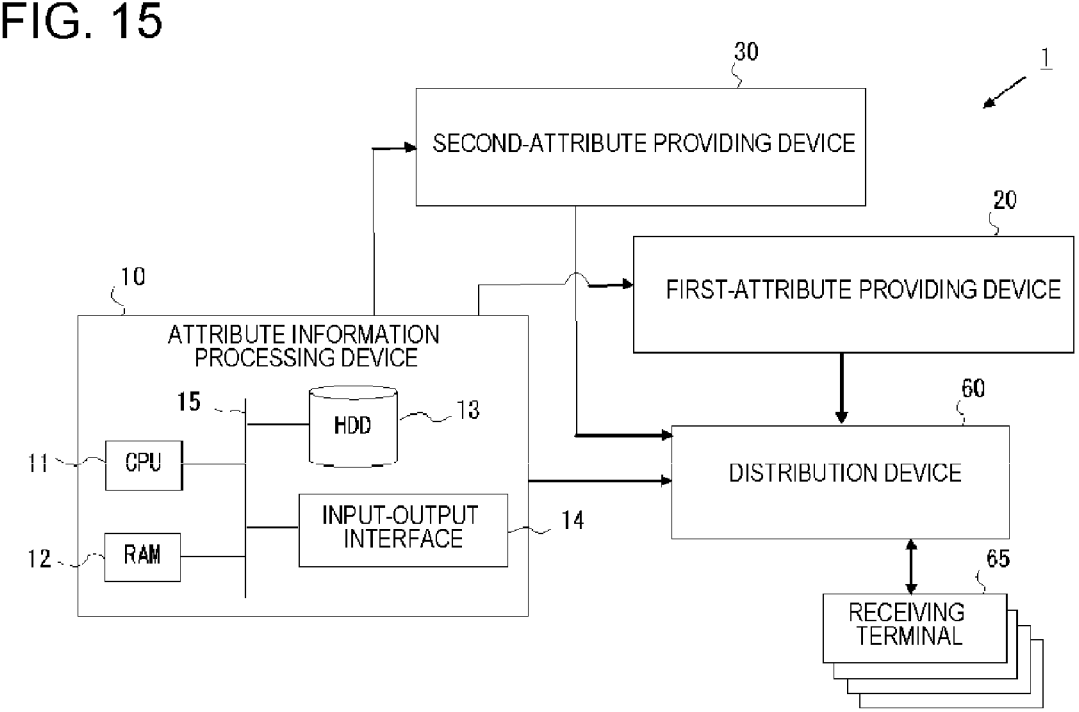
FIG. 15 is a diagram illustrating an example of a configuration of an attribute information evaluation system according to a third exemplary embodiment.

FIG. 15 is a diagram illustrating an example of a configuration of an attribute information evaluation system 1 according to a third exemplary embodiment. The attribute information evaluation system 1 according to the third exemplary embodiment includes a distribution device 60 instead of the relay device 50 in the second exemplary embodiment. In the third exemplary embodiment, the distribution device 60 determines a user having attribute information that matches attribute information inputted by an information distribution operator, and distributes predetermined information such as advertisement information to a receiving terminal 65 of the determined user. Thus, the attribute information inputted by the information distribution operator serves as a condition for determining the distribution destination of the predetermined information, and is also referred to as condition attribute information. On the other hand, attribute information on each user is used for determining whether or not the attribute information matches the condition attribute information, and is also referred to as target attribute information.

Further, in the third exemplary embodiment, an example will be give in which, in addition to the configuration of the second exemplary embodiment, the attribute information evaluation system 1 further has a configuration in which an attribute type of the attribute information can be concealed. Below, each device constituting the attribute information evaluation system 1 will be described while a focus of the description is being placed mainly on differences from those in the second exemplary embodiment.

[Attribute Information Processing Device]

Figure 16:
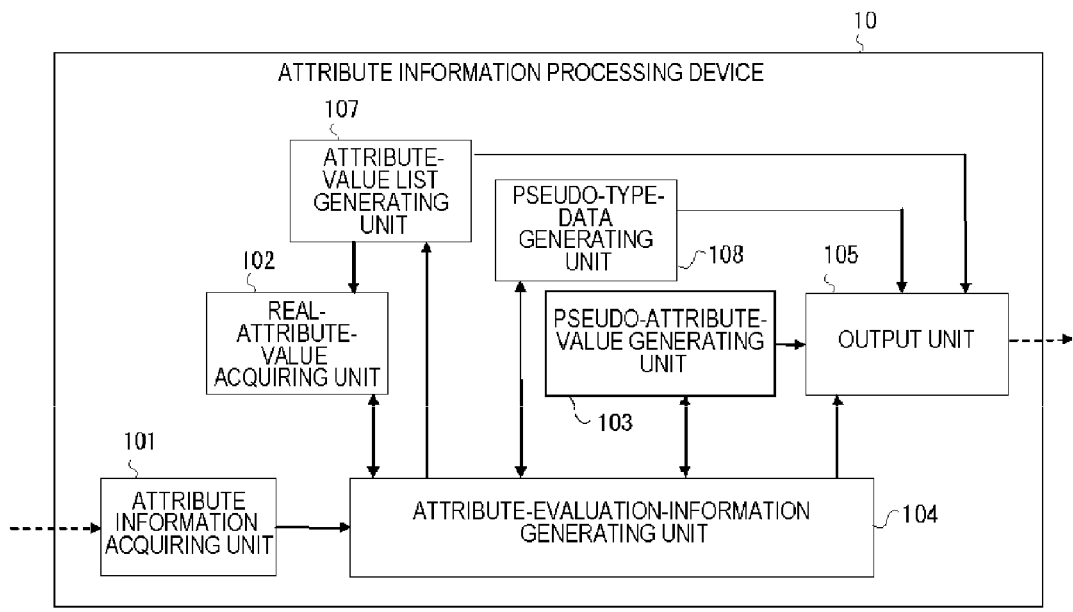
FIG. 16 is a schematic view illustrating an example of a process configuration of an attribute information processing device according to the third exemplary embodiment.

FIG. 16 is a schematic view illustrating an example of a process configuration of a processing device 10 according to the third exemplary embodiment. As illustrated in FIG. 16, in addition to the configuration of the second exemplary embodiment, the processing device 10 according to the third exemplary embodiment further includes a pseudo-type-data generating unit 108.

The attribute information acquiring unit 101 acquired the condition attribute information inputted by the information distribution operator, and sends the acquired condition attribute information to the generating unit 104.

The pseudo-type-data generating unit 108 acquired an attribute type from the condition attribute information, and converts data of the acquired attribute type into pseudo type data. It is only necessary that the converted pseudo type data has a format in which a third party cannot recognize information on the original attribute type, and hence, for example, the converted pseudo type data is generated as a character string or values generated in a random manner. More specifically, for example, an attribute type "recently purchased goods" is converted into a pseudo type data "TYPE1" (character string).

The pseudo-type-data generating unit 108 generates type conversion information in which the original attribute type and the converted pseudo type data are associated with each other. In the case of the example described above, ("recently purchased goods"—"TYPE1") is generated as the type conversion information. The pseudo-type-data generating unit 108 sends the pseudo type data to the generating unit 104, and the type conversion information and the conversion ID to the output unit 105.

As in the first exemplary embodiment and the second exemplary embodiment, the generating unit 104 generates attribute evaluation information for the condition attribute information. However, in the third exemplary embodiment, the generating unit 104 generates the attribute evaluation information such that the generated attribute evaluation information contains the pseudo type data instead of the attribute type. Thus, for example, "first-attribute providing device 20.TYPE1+second-attribute providing device 30.TYPE1=4" is generated as the attribute evaluation information. In other words, the attribute evaluation information generated in the third exemplary embodiment does not contain data of the attribute type.

The output unit 105 sends the attribute evaluation information generated by the generating unit 104 to the distribution device 60. Further, the output unit 105 outputs the type conversion information and the conversion ID to make these pieces of information stored in the first-attribute providing device 20, which is the same destination to which the attribute-value list is sent. At this time, the output unit 105 may directly send these pieces of information to the first-attribute providing device 20.

[First-attribute Providing Device and Second-attribute Providing Device]

Figure 17:
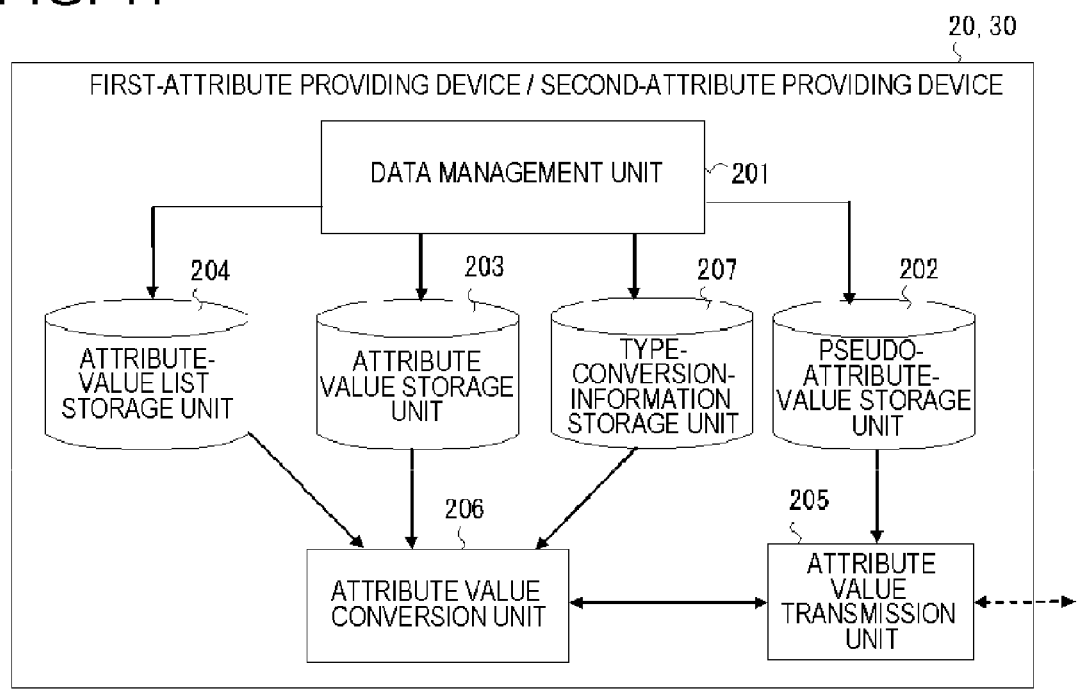
FIG. 17 is a schematic view illustrating an example of a process configuration of a first-attribute providing device or second-attribute providing device according to the third exemplary embodiment.

FIG. 17 is a schematic view illustrating an example of process configurations of the first-attribute providing device 20 and the second-attribute providing device 30 in the third exemplary embodiment. As in the second exemplary embodiment, in the third exemplary embodiment, the first-attribute providing device 20 and the second-attribute providing device 30 have the same process configuration, and data stored therein are different between the first-attribute providing device 20 and the second-attribute providing device 30. In the following descriptions, the first-attribute providing device 20 and the second-attribute providing device 30 are not specifically separated and are collectively referred to as an attribute providing device, except when these need to be specifically separated.

As illustrated in FIG. 17, in addition to the configuration of the second exemplary embodiment, the attribute providing device according to the third exemplary embodiment further includes a type-conversion-information storage unit 207. The data management unit 201 further manages the type-conversion-information storage unit 207. The data management unit 201 stores the type conversion information and the conversion ID outputted from the output unit 105 of the processing device 10 in the type-conversion-information storage unit 207.

FIG. 18 is a diagram illustrating an example of the type-conversion-information storage unit 207. As illustrated in FIG. 18, the type-conversion-information storage unit 207 stores the conversion ID and the type conversion information outputted from the output unit 105 of the processing device 10 in a manner that they are associated with each other.

The attribute providing device according to the third exemplary embodiment is different from that in the second exemplary embodiment in that, when the attribute providing device according to the third exemplary embodiment receives a request for an attribute value from the distribution device 60, this request includes pseudo type data instead of the attribute type. The attribute value conversion unit 206 uses the type conversion information extracted from the type-conversion-information storage unit 207 to re-convert the pseudo type data into the information on the original attribute type, and thereafter, performs processes similar to those in the second exemplary embodiment. In Example of Operation below, a specific description will be made of processes performed by the attribute value conversion unit 206.

[Distribution Device]

Figure 19:
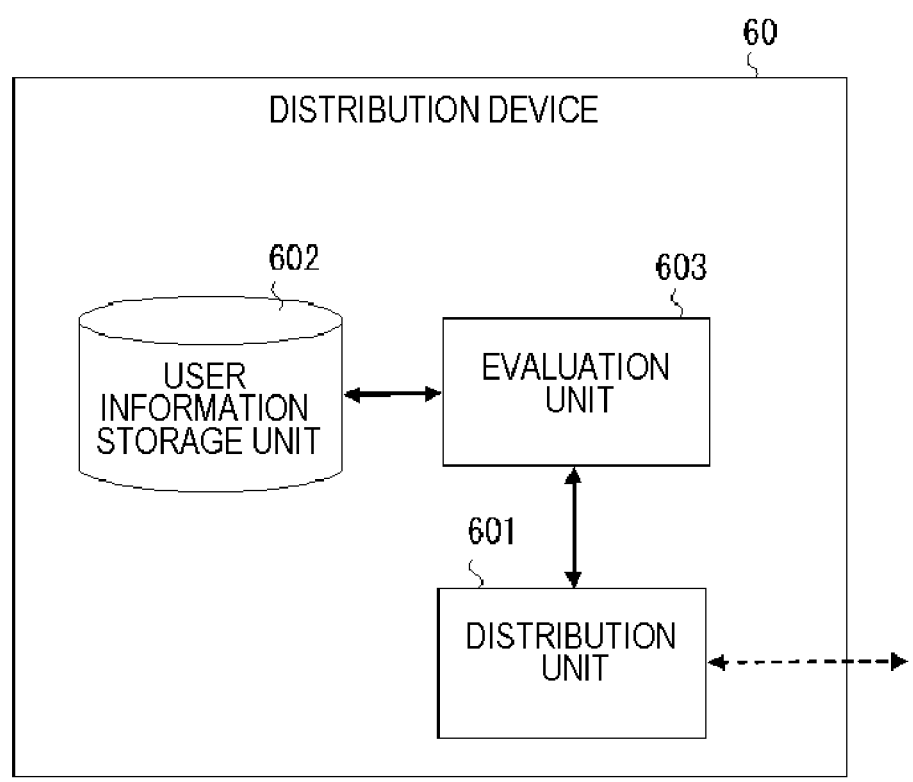
FIG. 19 is a schematic view illustrating an example of a process configuration of a distribution device according to the third exemplary embodiment.

FIG. 19 is a schematic view illustrating an example of a process configuration of the distribution device 60 according to the third exemplary embodiment. As illustrated in FIG. 19, the distribution device 60 includes a distribution unit 601, a user information storage unit 602, an evaluation unit 603. In the distribution device 60, these processing units are configured, for example, as hardware circuit such as an IC chip. Further, the distribution device 60 may be configured to include a CPU, a memory, an input-output interface, and causes the CPU to run a program stored in the memory, thereby realizing the above-described processing units. This exemplary embodiment does not limit the hardware configuration of the distribution device 60.

The distribution unit 601 is connected to plural receiving terminals 65 through a network in a manner that they can communicate with each other, and distributes predetermined information such as advertisement information and news information to determined receiving terminals from among the plural receiving terminals 65. Note that this exemplary embodiment does not limit the form of the network, communication protocols, or communication form.

Upon receiving the conversion ID and the attribute evaluation information from the processing device 10, the distribution unit 601 determines a user having attribute information that matches condition attribute information serving as the source of the received attribute evaluation information from among users stored in the user information storage unit 602. The distribution unit 601 sends a terminal ID for identifying each user, the conversion ID and the attribute evaluation information to the evaluation unit 603, and determines that a user that matches an evaluation result sent from the evaluation unit 603 is the distribution destination. The distribution unit 601 distributes the predetermined information to a receiving terminal 65 of the user determined as the distribution destination.

The user information storage unit 602 stores terminal IDs for identifying users that can be the distribution destination of the information. The user information storage unit 602 may store, for each information to be distributed, terminal IDs that can be the distribution destination.

The evaluation unit 603 receives the terminal ID, the conversion ID and the attribute evaluation information sent from the distribution unit 601, and makes an evaluation of whether the attribute information on the user identified on the basis of the terminal ID matches the condition attribute information that is the source of the received attribute evaluation information. The evaluation process made by the evaluation unit 603 is different from the second exemplary embodiment in that, since the pseudo type data is contained in the attribute evaluation information, the pseudo type data, instead of the attribute type, is sent to the first-attribute providing device 20 and the second-attribute providing device 30.

[Example of Operation]

Figure 20:
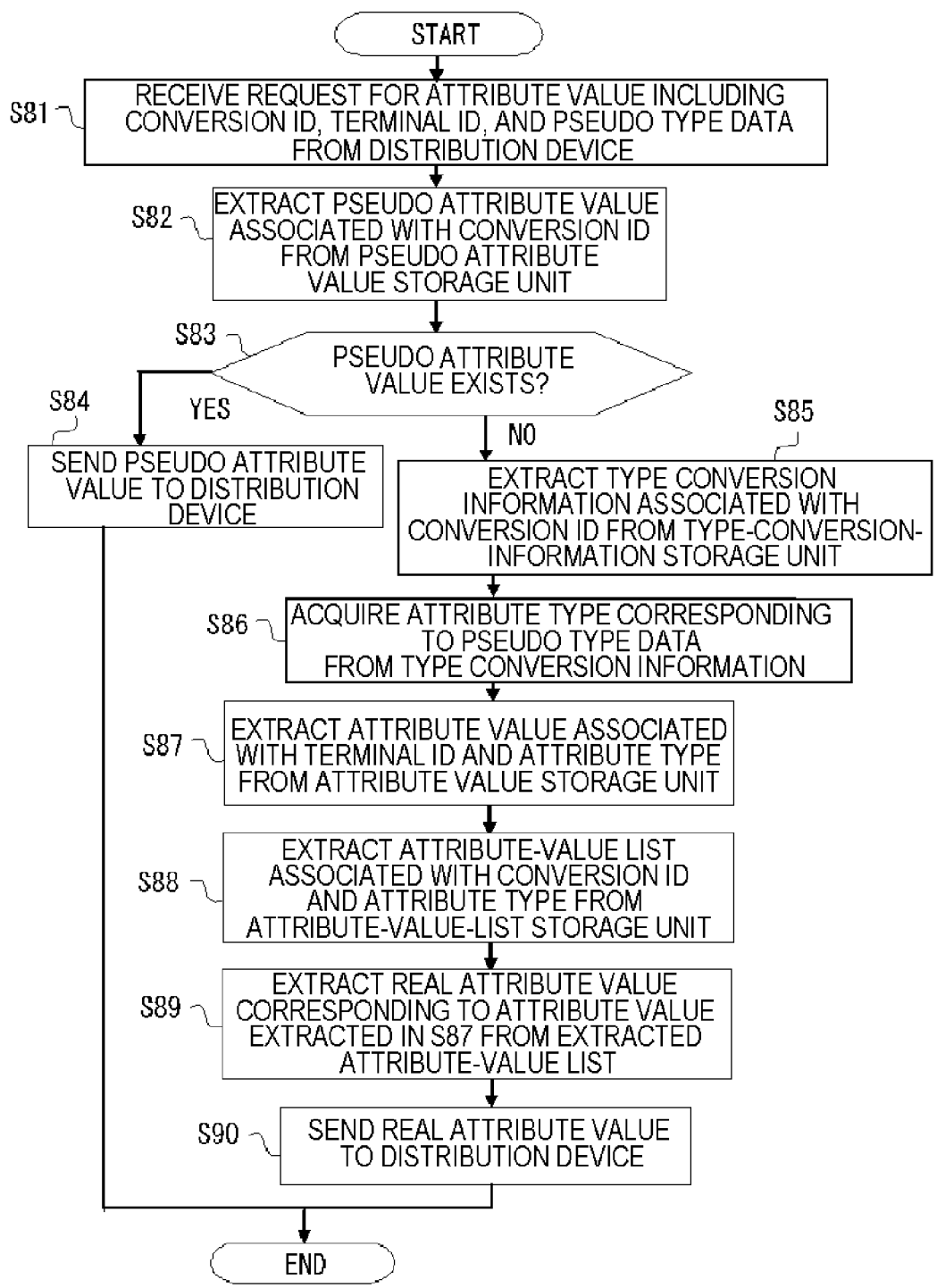
FIG. 20 is a flowchart showing an example of operations performed by the first-attribute providing device and the second-attribute providing device according to the third exemplary embodiment.

As described above, the attribute information evaluation system 1 according to the third exemplary embodiment uses the type conversion information, which is the difference from the second exemplary embodiment. Thus, the example of operations performed by the first-attribute providing device 20 and the second-attribute providing device 30 according to the third exemplary embodiment will be described with reference to FIG. 20. FIG. 20 is a flowchart showing an example of operations performed by the first-attribute providing device 20 and the second-attribute providing device 30 according to the third exemplary embodiment.

In the attribute providing device, the attribute value transmission unit 205 receives from the distribution device 60 a request for the attribute value including the conversion ID, the terminal ID, and the pseudo type data (S81). The third exemplary embodiment is different from the second exemplary embodiment in that the pseudo type data is received instead of the information on the attribute type. In this example, for example, the conversion ID "H001" and the pseudo type data "TYPE1" are received.

Thereafter, processes of S82, S83 and S84 are the same as those of S72, S73 and S74 illustrated in FIG. 14 in Example of Operation in the second exemplary embodiment except that the transmission destination of the pseudo attribute value is the distribution device 60. In other words, the third exemplary embodiment performs the processes same as those in the second exemplary embodiment in the case where the second-attribute providing device 30 serves as the attribute providing device.

The following is an example of operations in the case where the first-attribute providing device 20 serves as the attribute providing device. If the pseudo-attribute-value storage unit 202 does not store corresponding pseudo attribute values (NO in S83), the attribute value transmission unit 205 sends the conversion ID, the terminal ID, and the pseudo type data to the attribute value conversion unit 206.

The attribute value conversion unit 206 extracts type conversion information associated with the conversion ID from the type-conversion-information storage unit 207 (S85). In the example of FIG. 18, type conversion information ("recently purchased goods"—"TYPE1") associated with the conversion ID "H001" is extracted.

The attribute value conversion unit 206 acquires an attribute type corresponding to the pseudo type data from the extracted type conversion information (S86). In this example, the attribute type "recently purchased goods" corresponding to the pseudo type data "TYPE1" is acquired. As described above, the pseudo type data is re-converted into the information on the original attribute type.

Thereafter, processes of S87, S88, S89 and S90 are the same as those of S75, S76, S77 and S78 in FIG. 14 in Example of Operation in the second exemplary embodiment except that the transmission destination of the real attribute value is the distribution device 60.

As described above, the third exemplary embodiment uses the attribute evaluation information in which the attribute type is concealed, and an evaluation is made of whether the condition attribute information matches the attribute information on each user. Thus, the third party cannot know the attribute value as well as the attribute type on the basis of the attribute evaluation information that the distribution device 60 has. Further, even if the communication between the distribution device 60 and the attribute evaluation device is monitored, the information on the attribute type itself is not sent and received through the communication, and thus, the information on the attribute type does not leak. Hence, according to the third exemplary embodiment, it is possible to completely hide the information concerning the condition attribute information, which is know-how for the information distribution operator.

[Fourth Exemplary Embodiment]

Next, an attribute information evaluation system 1 according to the fourth exemplary embodiment will be described. For example, an attribute value of attribute information indicating location of a user is changed with certain frequency. More specifically, depending on types of the attribute information, attribute values stored in the attribute value storage unit 203 of the first-attribute providing device 20 are changed with certain frequency. If pseudo attribute values for the attribute information as described above are fixed, it may be easy for the third party to determine which attribute value held by the first-attribute providing device 20 and the second-attribute providing device 30 is the pseudo attribute value.

Thus, in addition to the configuration of the second exemplary embodiment or third exemplary embodiment described above, the attribute information evaluation system 1 according to the fourth exemplary embodiment further has a configuration in which the pseudo attribute value is changed with a predetermined timing. Below, the attribute information evaluation system 1 according to the fourth exemplary embodiment will be described by giving an example in which this additional configuration is added to the configuration of the second exemplary embodiment. In the following description, a focus will be placed mainly on the configuration different from that of the second exemplary embodiment.

Figure 21:
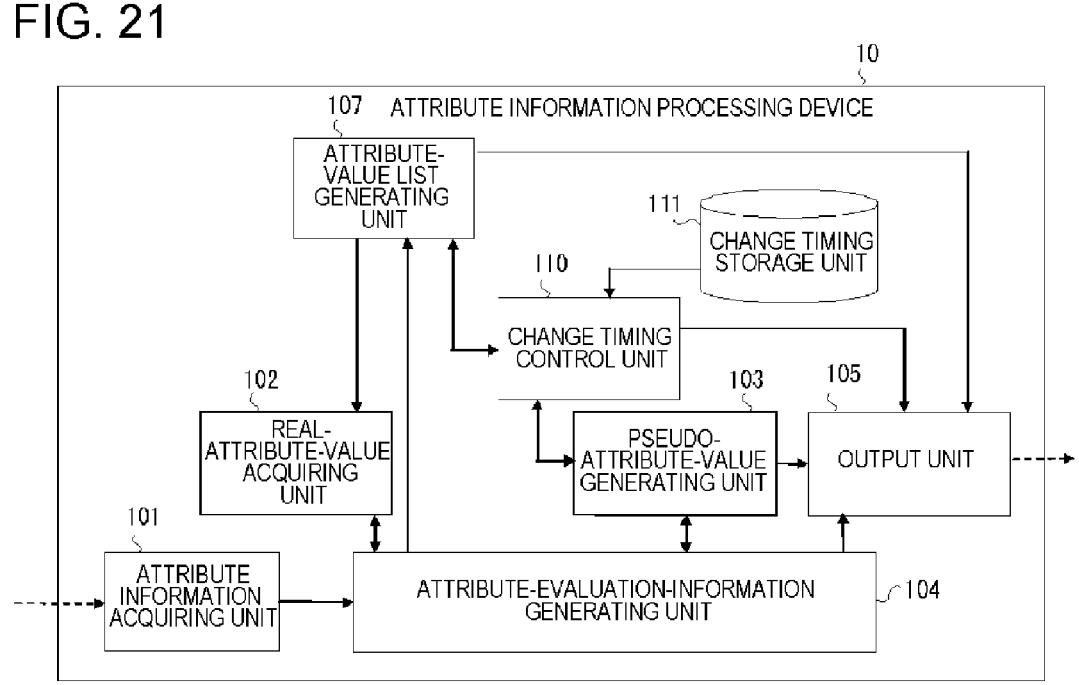
FIG. 21 is a schematic view illustrating an example of a process configuration of an attribute information processing device according to a fourth exemplary embodiment.

FIG. 21 is a schematic view illustrating an example of a process configuration of a processing device 10 according to the fourth exemplary embodiment. As illustrated in FIG. 21, in addition to the configuration of the second exemplary embodiment, the processing device 10 according to the fourth exemplary embodiment further includes a change timing control unit 110 and a change timing storage unit 111.

FIG. 22 is a diagram illustrating an example of the change timing storage unit 111. The change timing storage unit 111 stores a changing timing for each attribute type. FIG. 22 illustrates an example in which the attribute information on the attribute type "location" is updated with frequency of 5 times per hour, and the attribute information on the attribute type "age" is updated with frequency of once a year.

Upon receiving the conversion ID and the attribute type from the pseudo-attribute-value generating unit 103, the change timing control unit 110 determines whether the received attribute type is the target of change. If the attribute type is the target of change, the change timing control unit 110 sends an order for change to the pseudo-attribute-value generating unit 103 and the list generating unit 107 with the timing of change associated with the attribute type. The change timing control unit 110 extracts the timing of change associated with the attribute type from the change timing storage unit 111. If the timing of change associated with the attribute type is not stored in the change timing storage unit 111, the change timing control unit 110 determines that the attribute type is not the target of change.

The pseudo-attribute-value generating unit 103 sends the generated pseudo attribute value and the conversion ID to the output unit 105, then stores these pieces of information, and further sends the pseudo attribute value, the conversion ID, and the attribute type to the change timing control unit 110. Upon receiving an order for change from the change timing control unit 110, the pseudo-attribute-value generating unit 103 determines a pseudo attribute value that is the target for the change on the basis of the conversion ID contained in the order for change, and changes the determined pseudo attribute value in accordance with a predetermined rule. The pseudo-attribute-value generating unit 103 obtains, for example, a new pseudo attribute value by adding one to the original pseudo attribute value. The pseudo-attribute-value generating unit 103 sends to the output unit 105 the changed pseudo attribute value and the conversion ID together with the order for change.

The list generating unit 107 sends to the output unit 105 the generated attribute-value list, the attribute type of this attribute-value list, and the conversion ID, and holds these pieces of information. Upon receiving the order for change from the change timing control unit 110, the list generating unit 107 determines an attribute-value list that is the target for the change on the basis of the conversion ID and the attribute type contained in the order for change, and changes each real attribute value contained in the determined attribute-value list in accordance with a predetermined rule.

This predetermined rule corresponds to a rule for changing the above-described pseudo attribute value, and is set such that evaluation values of the attribute evaluation information do not change even if the changed pseudo attribute value is applied. For example, in the case where the rule for changing the pseudo attribute value indicates that one is added to the original pseudo attribute value, the rule for changing the attribute-value list indicates that one is subtracted from each real attribute value. The list generating unit 107 sends to the output unit 105 the thus changed attribute-value list, the conversion ID and the attribute type together with the order for change.

Upon receiving the order for change from the pseudo-attribute-value generating unit 103, the output unit 105 outputs the conversion ID and the pseudo attribute value in a manner such that the pseudo attribute value stored in the second-attribute providing device 30 is updated with the changed pseudo attribute value. Similarly, upon receiving the order for change from the list generating unit 107, the output unit 105 outputs the conversion ID, the attribute type, and the attribute-value list in a manner such that the attribute-value list stored in the first-attribute providing device 20 is updated with the changed attribute-value list.

[First-attribute Providing Device and Second-attribute Providing Device]

The attribute providing device according to the fourth exemplary embodiment is similar to that in the second exemplary embodiment except for the process of updating the pseudo attribute value and the attribute-value list. In the fourth exemplary embodiment, the data management unit 201 receives the changed pseudo attribute value and the changed attribute-value list outputted from the output unit 105 of the processing device 10, and updates the pseudo attribute value and the attribute-value list stored in the pseudo-attribute-value storage unit 202 with the changed pseudo attribute value and the changed attribute-value list.

As described above, in the fourth exemplary embodiment, the pseudo attribute value concerning the condition attribute information in which the attribute value is changed with certain frequency is changed at the timing of the change associated with the attribute type. With this configuration, it is possible to make it difficult for the third party to distinguish the pseudo attribute value and the real attribute value. Further, when the pseudo attribute value is changed, the attribute-value list is also changed so as to eliminate the need of changing the attribute evaluation information used for the evaluation. With this configuration, the relay device 50 having the attribute evaluation information for the evaluation does not detect that the pseudo attribute value is changed.

Thus, according to the fourth exemplary embodiment, it is possible to further reduce the risk of leakage of information.

[Fifth Exemplary Embodiment]

In the above-described fourth exemplary embodiment, the processing device 10 determines the timing for change, and generates the changed pseudo attribute value and the changed attribute-value list. However, these processes may be performed in the attribute providing device. In this fifth exemplary embodiment, a configuration in which a pseudo attribute value is updated with a predetermined timing is added to the attribute providing device in the second exemplary embodiment or third exemplary embodiment. Below, by giving an example in which this new configuration is added to the second exemplary embodiment, an attribute information evaluation system 1 according to the fifth exemplary embodiment will be described while a focus of the description is being placed mainly on configurations different from those in the second exemplary embodiment.

[First-attribute Providing Device and Second-attribute Providing Device]

In the fifth exemplary embodiment, the data management unit 201 monitors a change in attribute values stored in the attribute value storage unit 203. As described above, for example, the attribute information reflecting the current location of a user is changed when the user moves to another location. Upon detecting that the attribute value is changed, the data management unit 201 determines an attribute type of the changed attribute value on the basis of the attribute value storage unit 203. Then, the data management unit 201 changes an attribute-value list corresponding to the determined attribute type stored in the attribute-value list storage unit 204. The attribute-value list is changed in a manner similar to that in the fourth exemplary embodiment described above.

Upon changing the attribute-value list, the data management unit 201 sends to other attribute providing device an order for changing the pseudo attribute value together with the conversion ID concerning the attribute-value list. It should be noted that, in the case where there are plural attribute providing devices that have an attribute-value list, the order for changing the attribute-value list may be sent to other attribute providing device. Further, in the case where there are plural attribute providing devices that have a pseudo attribute value, the order for changing the pseudo attribute value may be sent to two or more attribute providing devices.

Upon receiving the order for changing the pseudo attribute value from other attribute providing device, the data management unit 201 searches the pseudo-attribute-value storage unit 202 using a conversion ID contained in the order for change. Upon extracting the pseudo attribute value corresponding to the conversion ID from the pseudo-attribute-values storage unit 202, the data management unit 201 changes the extracted pseudo attribute value in accordance with a predetermined rule, and updates the pseudo-attribute-value storage unit 202 using the changed pseudo attribute value. The rule for changing the pseudo attribute value is similar to that in the fourth exemplary embodiment.

As described above, it is possible to change the pseudo attribute value only through the processes performed by the attribute providing device. According to the fifth exemplary embodiment, in a manner similar to that in the fourth exemplary embodiment, it is possible to make it difficult for the third party to distinguish the pseudo attribute value and the real attribute value. Note that it may be possible to employ a configuration in which the processing device 10 determines the timing for changing the pseudo attribute value, and the changed pseudo attribute value and the changed attribute-value list are performed on the attribute providing device side.

[Sixth Exemplary Embodiment]

In the exemplary embodiments described above, the following problem may occur if the second-attribute providing device 30 that stores the pseudo attribute values is determined arbitrarily. For example, in the case where the attribute type of the condition attribute information is "recently purchased goods=game," the first-attribute providing device 20 is an online shopping website, and the second-attribute providing device 30 is a hospital website, the third party may know that the second-attribute providing device 30 provides the pseudo attribute value. Further, with the system that conceals the attribute type as in the third exemplary embodiment, in the case where the first-attribute providing device 20 and the second-attribute providing device 30 belong to servers in the same industrial field, the attribute types that should be concealed may be easily known on the basis of the industrial field of these attribute providing devices.

In view of the circumstances described above, in the sixth exemplary embodiment, a configuration of appropriately selecting the second-attribute providing device 30 that stores the pseudo attribute value is added to any one of the first to fifth exemplary embodiments. Below, by giving an example in which this new configuration is added to the second exemplary embodiment, the attribute information evaluation system 1 according to the sixth exemplary embodiment will be described while a focus of the description is being placed mainly on configurations different from those in the second exemplary embodiment.

The attribute information evaluation system 1 according to the sixth exemplary embodiment includes three or more attribute providing devices (denoted by attribute providing device A, B, and C). In the sixth exemplary embodiment, the first-attribute providing device 20 and the second-attribute providing device 30 are selected from among these attribute providing devices.

Figure 23:
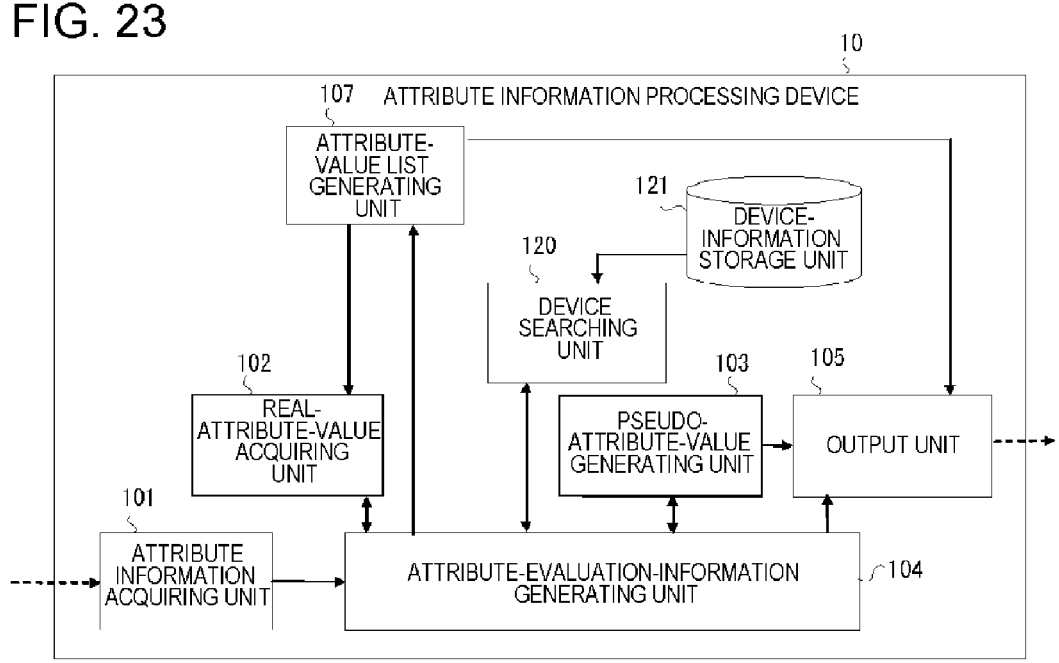
FIG. 23 is a schematic view illustrating an example of a process configuration of an attribute information processing device according to a sixth exemplary embodiment.

FIG. 23 is a schematic view illustrating an example of a process configuration of the processing device 10 according to the sixth exemplary embodiment. As illustrated in FIG. 23, in addition to the configuration of the second exemplary embodiment, the processing device 10 according to the sixth exemplary embodiment includes a device searching unit 120 and a device information storage unit 121.

FIG. 24 is a diagram illustrating an example of the device information storage unit 121. The device information storage unit 121 stores attribute types and information on attribute providing devices that provide attribute information on each of the attribute types. The information on an attribute providing device represents, for example, address information on the device. In the example shown in FIG. 24, as attribute providing devices that can provide attribute information on the attribute type "location," information on the attribute providing devices A, B, and C is stored. Further, as attribute providing devices that can provide attribute information on the attribute type "recently purchased goods," information on the attribute providing devices A and B is stored.

When determining the acquisition source of the pseudo attribute value, the generating unit 104 sends to the device searching unit 120 information on the attribute providing device that stores the attribute type and the attribute-value list together with a request for search. The generating unit 104 determines any one of the attribute providing devices identified on the basis of the information sent from the device searching unit 120 to be the second-attribute providing device 30, and sends the information on the second-attribute providing device 30 to the output unit 105. The output unit 105 outputs the conversion ID and the pseudo attribute value so as to store these pieces of information in the second-attribute providing device 30.

Upon receiving the request for search from the generating unit 104, the device searching unit 120 extracts from the device information storage unit 121 the information on the attribute providing device stored so as to be associated with the attribute type contained in the request for search. For example, in the example shown in FIG. 24, upon receiving the request for search concerning the attribute type "location," the device searching unit 120 extracts information on each of the attribute providing devices A, B and C. The device searching unit 120 sends to the generating unit 104 the information in which the information on the attribute providing device storing the attribute-value list is excluded from the extracted information. For example, in the case where the attribute providing device storing the attribute-value list is the attribute providing device A, information on each of the attribute providing devices B and C is sent to the generating unit 104.

As described above, in the sixth exemplary embodiment, the attribute providing device that provides the attribute information on the attribute type same as that in the first-attribute providing device 20 serving as the acquisition source of the real attribute value is selected as the second-attribute providing device 30 serving as the acquisition source of the pseudo attribute value. According to the sixth exemplary embodiment, with this configuration, it is possible to make it difficult for the third party to know the second-attribute providing device 30 that provides the pseudo attribute value.

It should be noted that, by adding such a configuration to the third exemplary embodiment in which the attribute type is concealed, it is only necessary for the device searching unit 120 to extract the information on the attribute providing device associated with the attribute type other than an attribute type sent from the generating unit 104. With this mode, the attribute providing device that can provide the attribute information on the attribute type different from that in the first-attribute providing device 20 serving as the acquisition source of the real attribute value is selected as the second-attribute providing device 30 serving as the acquisition source of the pseudo attribute value. With this mode, it is possible to make it difficult to know the attribute type on the basis of the information on the attribute providing device.

[Modification Example of Sixth Exemplary Embodiment]

In the above-described sixth exemplary embodiment, the attribute providing device can be further effectively selected with the following manner. For example, in the case where an attribute value "male" accounts for 80% of the attribute information concerning an attribute type "gender" in both of the first-attribute providing device 20 and the second-attribute providing device 30, condition attribute information thereof can be expected to be "gender=male" if the attribute type "gender" is known. Thus, it may be possible to employ a configuration in which the percentage of each attribute value stored in each attribute providing device is managed for each attribute type, and appropriate attribute providing device is selected using this percentage information.

FIG. 25 is a diagram illustrating an modification example of the device information storage unit 121. For each attribute type, the device information storage unit 121 stores the percentage of each attribute value stored in each attribute providing device. In this modification example, the device searching unit 120 excludes the attribute providing device storing the attribute-value list from among the attribute providing devices extracted as described in the sixth exemplary embodiment, and further narrows down appropriate attribute providing device from the remaining attribute providing devices as described below.

The device searching unit 120 selects the second-attribute providing device 30 in a manner such that the percentage of the attribute information same as condition attribute information of all the attribute information stored in the attribute providing device and concerning the attribute type of the condition attribute information is averaged between the first-attribute providing device 20 and the second-attribute providing device 30. In this specification, the expression "is averaged between" means that, for example, this percentage is brought close to 50%. In the example in FIG. 25, in the case where the condition attribute information is "gender=female" and the attribute providing device A is selected as the first-attribute providing device 20, the device searching unit 120 selects the attribute providing device B. This is because the percentage of the attribute value "female" is 80% for the attribute providing device A, and the same percentage is 20% for the attribute providing device B. In this example, this percentage for the remaining attribute providing device C is 80%, and thus, the attribute providing device C is excluded.

It should be noted that, in the exemplary embodiments described above, the example has been given in which the first-attribute providing device 20 and the second-attribute providing device 30 are determined on the basis of the information stored in the processing device 10. However, it may be possible to determine the first-attribute providing device 20 and the second-attribute providing device 30 on the basis of the information stored in an external device. According to the above-described sixth exemplary embodiment, the device information storage unit 121 may be included in the external device.

Supplements for the Above-described Exemplary Embodiments

In the above-described exemplary embodiments, an description has been made as an example in which the attribute information (condition attribute information) acquired by the attribute information acquiring unit 101 of the processing device 10 is formed by the attribute type and the attribute value as a pair. However, the condition attribute information may be formed by two or more pairs. For example, the condition attribute information may be formed by "preference=game" and "gender=male." In this case, as examples, an attribute-value list is formed for an attribute type "preference," an attribute-value list is formed for an attribute type "gender," and these attribute-value lists are stored in the first-attribute providing device 20. Further, the attribute-value lists may be stored separately in different first-attribute providing devices 20.

For example, a pseudo attribute value is generated for an attribute type "preference," a pseudo attribute value is generated for attribute type "gender," and these pseudo attribute values are stored in the second-attribute providing device 30. Further, the pseudo attribute values may be stored separately in different second-attribute providing devices 30. Further, regardless of the number of the attribute types, only one pseudo attribute value may be generated, or three or more pseudo attribute values may be generated.

In this example, the generating unit 104 of the processing device 10 generates the attribute evaluation information such as "first-attribute providing device 20.preference+first-attribute providing device 20.gender+second-attribute providing device 30.preference+second-attribute providing device 30.gender=50." In other words, this exemplary embodiment does not limit the number of the variables constituting the function contained in the attribute evaluation information. In the case where the function contains three or more variables as described above, it may be possible to determine the real attribute value and the pseudo attribute value to be different prime numbers, and determine the function for them to be a product of the variables. With the configuration as described above, it is possible to prevent the case where, even if the attribute information serving as the comparison target does not match the attribute information serving as the source of the attribute evaluation information, the calculated evaluation value accidentally matches the evaluation value contained in the attribute evaluation information.

Further, it may be possible to employ, as this function, a hash function with a product of each variable in the case where different prime numbers are used for each of the real attribute value and the pseudo attribute value. This is because, if the function is formed by multiplication of simple prime numbers, values of the variables (prime numbers) can be known by subjecting these evaluation values to prime factorization. For example, in the case where the evaluation value contained in the attribute evaluation information is 1430, it is possible to identify 2, 5, 11, and 13 by subjecting 1430 to prime factorization. Through this calculation, the third party can expect that the attribute providing device that sends values other than these identified prime numbers is the first-attribute providing device 20, and further, the values sent by the attribute providing device are the real attribute values. In order to address these problems, it is only necessary to use a one-way function such as a hash function as the function and employ an irreversible calculation to obtain attribute evaluation information. This makes it possible to prevent location information on the attribute information or other information from being expected on the basis of the evaluation values.

Further, in the exemplary embodiments described above, an example has been given in which the attribute-value list is formed by associating the attribute values with the real attribute values. However, it may be possible that the attribute-value list is formed by a function with which real attribute values can be obtained on the basis of attribute values. For example, ("age"×"2") may be generated as the attribute list for attribute information "age=18." In this case, the real attribute value is "36."

Further, evaluation of attribute information using the attribute evaluation information generated by the processing device 10 described above can be applied to services other than those in the second exemplary embodiment and the third exemplary embodiment described above. For example, this evaluation may be applied to access control application in which a determination is made as to whether to permit access to certain information. This exemplary embodiment does not limit applicable services.

The present application claims priority based on Japanese Patent Application No. 2010-211521 filed on Sep. 22, 2010, the disclosures of which are incorporated herein by reference in their entirety.

The invention claimed is:

1. An attribute information processing device comprising:
a processor; and
a memory having stored thereon a program that, when executed by the processor, implements:
an attribute information acquiring unit that acquires attribute information including an attribute type and an attribute value indicating a state or value of the attribute type;
an attribute value acquiring unit that acquires at least two types of attribute values including a first-type attribute value and a second-type attribute value each corresponding to an attribute value of the attribute information acquired by the attribute information acquiring unit;
a generating unit that:
determines a function for obtaining an evaluation value from the at least two types of attribute values acquired by the attribute value acquiring unit;
determines an acquisition source of the first-type attribute value to be a first-attribute providing device that can provide the first-type attribute value concerning attribute information serving as a comparison target;
determines an acquisition source of the second-type attribute value to be a second-attribute providing device different from the first-attribute providing device; and
generates attribute evaluation information containing information on the function, an evaluation value, information for identifying the first-attribute providing device, and information for identifying the second-attribute providing device; and
an output unit that outputs the second-type attribute value so as to be stored in the second-attribute providing device serving as the acquisition source of the second-type attribute value, and outputs the attribute evaluation information to be used for evaluating the attribute information acquired by the attribute information acquiring unit and the attribute information serving as the comparison target.

2. The attribute information processing device according to claim 1, wherein
the program, when executed by the processor, further implements a list generating unit that identifies all the attribute values that the attribute type of the attribute information acquired by the attribute information acquiring unit can take, determines a first-type attribute value corresponding to each of the identified attribute values, and generates an attribute-value list in which the identified attribute value and a determined attribute value are associated with each other, and
the output unit outputs the attribute-value list generated by the list generating unit to be stored in the first-attribute providing device serving as the acquisition source of the first-type attribute value.

3. The attribute information processing device according to claim 2, wherein the program, when executed by the processor, further implements a changing unit that changes the second-type attribute value outputted by the output unit and the first-type attribute value included in the attribute-value list outputted by the output unit at a timing corresponding to each attribute type.

4. The attribute information processing device according to claim 1, wherein
the program, when executed by the processor, further implements an attribute type conversion unit that converts data on the attribute type of the attribute information acquired by the attribute information acquiring unit into pseudo type data from which an original attribute type cannot be recognized, and generates type conversion information in which the original attribute type and the converted pseudo type data are associated with each other, and
the output unit outputs the type conversion information generated by the attribute type conversion unit to be stored in the first-attribute providing device serving as the acquisition source of the first-type attribute value.

5. The attribute information processing device according to claim 1, where the program, when executed by the processor, further implements a device searching unit that selects an attribute providing device corresponding to the attribute type of the attribute information acquired by the attribute information acquiring unit from a device information storage unit that stores, for each attribute type, information on the attribute providing device storing the attribute information concerning the attribute type, and determines an attribute providing device different from the first-attribute providing device, which has been determined to be the acquisition source of the first-type attribute value, to be a second-attribute providing device from among the selected attribute providing device.

6. An attribute information processing method performed by a computer and including:
   acquiring attribute information including an attribute type and an attribute value indicating a state or value of the attribute type;
   acquiring at least two types of attribute values including a first-type attribute value and a second-type attribute value each corresponding to an attribute value of the acquired attribute information;
   determining a function for obtaining an evaluation value from the acquired at least two types of attribute values;
   determining an acquisition source of the first-type attribute value to be a first-attribute providing device that can provide the first-type attribute value concerning attribute information serving as a comparison target;
   determining an acquisition source of the second-type attribute value to be a second-attribute providing device different from the first-attribute providing device;
   generating attribute evaluation information containing information on the function, an evaluation value, information for identifying the first-attribute providing device, and information for identifying the second-attribute providing device;
   outputting the second-type attribute value so as to be stored in the second-attribute providing device serving as the acquisition source of the second-type attribute value; and
   outputting the attribute evaluation information to be used for evaluating the acquired attribute information and the attribute information serving as the comparison target.

7. An attribute information evaluation system comprising an attribute information processing device configured to process attribute information including an attribute type and an attribute value indicating a state or value of the attribute type, a first-attribute providing device configured to hold attribute information serving as a comparison target, a second-attribute providing device, and an evaluation device,
   said attribute information processing device comprising:
      a first processor; and
      a first memory having stored thereon a program that, when executed by the first processor, implements:
         an attribute information acquiring unit that acquires the attribute information;
         an attribute value acquiring unit that acquires at least two types of attribute values including a first-type attribute value and a second-type attribute value each corresponding to an attribute value of the attribute information acquired by the attribute information acquiring unit;
         a generating unit that determines a function for obtaining an evaluation value from the at least two types of attribute values acquired by the attribute value acquiring unit, and generates attribute evaluation information containing information on the function, an evaluation value, information for identifying the first-attribute providing device serving as an acquisition source of the first-type attribute value, and information for identifying the second-attribute providing device serving as an acquisition source of the second-type attribute value; and
         an output unit that outputs the second-type attribute value acquired by the attribute value acquiring unit and the attribute evaluation information generated by the generating unit,
   said first-attribute providing device comprising:
      a second processor; and
      a second memory having stored thereon a program that, when executed by the second processor, implements a transmitting unit that, in response to a request from the evaluation device, transmits a first-type attribute value corresponding to an attribute value of the attribute information serving as the comparison target to the evaluation device,
   said second-attribute providing device comprising:
      a third processor; and
      a third memory having stored thereon a program that, when executed by the third processor, implements:
         a storage unit that stores, in a second-type attribute value storage unit, the second-type attribute value outputted by the output unit of the attribute information processing device; and
         a transmitting unit transmitter configured to, in response to a request from the evaluation device, transmit the second-type attribute value stored in the second-type attribute value storage unit to the evaluation device, and
   said evaluation device comprising:
      a fourth processor; and
      a fourth memory having stored thereon a program that, when executed by the fourth processor, implements an evaluation unit configured to:
         acquire the first-type attribute value and the second-type attribute value from the first-attribute providing device and the second-attribute providing device on the basis of information on the acquisition sources of the first-type attribute value and the second-type attribute value contained in the attribute evaluation information outputted by output unit of the attribute information processing device; and
         calculate a new evaluation value by applying the acquired first-type attribute value and second-type attribute value to the function contained in the attribute evaluation information; and
         evaluate the attribute information acquired by the attribute information acquiring unit of the attribute information processing device and the attribute information serving as the comparison target by comparing the new evaluation value with the evaluation value contained in the attribute evaluation information.

8. A non-transitory computer-readable storage medium storing a program for causing a computer to realize:
   an attribute information acquiring unit that acquires attribute information including an attribute type and an attribute value indicating a state or value of the attribute type;
   an attribute value acquiring unit that acquires at least two types of attribute values including a first-type attribute value and a second-type attribute value corresponding to an attribute value of the attribute information acquired by the attribute information acquiring unit;

a generating unit that:

determines a function for obtaining an evaluation value from the at least two types of attribute values acquired by the attribute value acquiring unit;

determines an acquisition source of the first-type attribute value to be a first-attribute providing device that can provide the first-type attribute value concerning attribute information serving as a comparison target;

determines an acquisition source of the second-type attribute value to be a second-attribute providing device different from the first-attribute providing device; and generates attribute evaluation information containing information on the function, an evaluation value, information for identifying the first-attribute providing device, and information for identifying the second-attribute providing device; and an output units that outputs the second-type attribute value so as to be stored in the second-attribute providing device serving as the acquisition source of the second-type attribute value, and outputs the attribute evaluation information to be used for evaluating the attribute information acquired by the attribute information acquiring unit and the attribute information serving as the comparison target.

* * * * *